(12) United States Patent
Horikawa et al.

(10) Patent No.: US 6,396,952 B1
(45) Date of Patent: *May 28, 2002

(54) COMPUTER ANIMATION GENERATOR

(75) Inventors: Junji Horikawa, Tokyo; Takashi Totsuka, Chiba, both of (JP)

(73) Assignee: Sony Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/366,549

(22) Filed: Aug. 4, 1999

Related U.S. Application Data

(63) Continuation of application No. 08/755,129, filed on Nov. 25, 1996, now Pat. No. 5,963,668.

(30) Foreign Application Priority Data

Dec. 18, 1995 (JP) .............................................. 7-348403

(51) Int. Cl.[7] .................................................. G06K 9/46
(52) U.S. Cl. ........................ 382/203; 382/266; 345/420
(58) Field of Search ................................. 382/203, 266; 395/141, 119; 345/420, 421, 434

(56) References Cited

U.S. PATENT DOCUMENTS

| 4,152,766 A | 5/1979 | Osofsky et al. ............. 364/515 |
| 4,600,919 A | 7/1986 | Stern ........................ 395/175 |
| 4,694,407 A | 9/1987 | Ogden ........................ 364/518 |
| 4,783,829 A | 11/1988 | Miyakawa et al. ........... 382/22 |
| 4,969,204 A | 11/1990 | Melnychuck et al. ......... 382/56 |
| 5,029,228 A | 7/1991 | Nonoyama et al. ........... 382/56 |
| 5,159,512 A | * 10/1992 | Evans et al. ................ 345/419 |
| 5,276,786 A | 1/1994 | Long et al. ................ 395/128 |
| 5,341,466 A | 8/1994 | Perlin et al. ................ 395/139 |
| 5,373,375 A | 12/1994 | Weldy ........................ 358/523 |
| 5,384,904 A | 1/1995 | Sprague et al. ............. 395/139 |

(List continued on next page.)

OTHER PUBLICATIONS

Mesh Optimization; Computer Graphics Proceedings, Annual Conference Series, 1993 Hoppe et al.; pp. 19–26.
Re–Tiling Polygonal Surfaces; Computer Graphics, 26, Jul. 2, 1992; Greg Turk; pp. 55–64.
An Adaptive Subdivision Method for Surface–Fitting from Sampled Data; Schmitt et al.; SIGGRAPH '86; vol. 20, No. 4, 1986; pp. 179–188.

*Primary Examiner*—Jose L. Couso
*Assistant Examiner*—Anh Hong Do
(74) *Attorney, Agent, or Firm*—Rader, Fishman & Grauer PLLC; Ronald P. Kananen

(57) ABSTRACT

Polygonal data input in a first step is subjected to evaluation in which all edges of the polygon data are ranked in importance on the basis of a volume change caused by removal of that edge. The edges are sorted on the basis of an evaluation value in a third step. In a fourth step, the edge of a small evaluation value is determined to be an edge of a small influence on the general shape and is removed. In a fifth step, a new vertex is determined from the loss of vertex by the edge removal. In a sixth step, a movement of texture coordinates and a removal of the texture after the edge removal are executed on the basis of the area change of the texture due to the edge removal by a predetermined evaluating function. In a seventh step, by repeating the processes in the second to sixth steps, a polygon model approximated to a desired layer can be obtained.

304 Claims, 15 Drawing Sheets

U.S. PATENT DOCUMENTS

| | | | |
|---|---|---|---|
| 5,448,686 A | 9/1995 | Borrel et al. | 395/120 |
| 5,490,239 A | 2/1996 | Myers | 395/129 |
| 5,506,947 A | 4/1996 | Taubin | 395/133 |
| 5,590,248 A * | 12/1996 | Zarge et al. | 395/121 |
| 5,611,036 A * | 3/1997 | Berend et al. | 345/441 |
| 5,613,051 A | 3/1997 | Iodice et al. | 395/128 |
| 5,621,827 A | 4/1997 | Uchiyama et al. | 382/307 |
| 5,689,577 A | 11/1997 | Arata | 382/128 |
| 5,761,332 A | 6/1998 | Wischmann et al. | 382/131 |
| 5,774,130 A | 6/1998 | Horikawa et al. | 345/441 |
| 5,796,400 A | 8/1998 | Atkinson et al. | 345/420 |
| 5,963,668 A * | 10/1999 | Horikawa et al. | 382/203 |

* cited by examiner

E:edge, Ni:normal, Ai:area,
v1~v10:vertices

Fig. 12
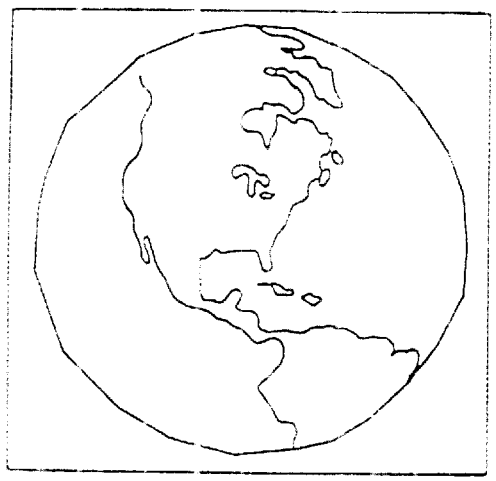
original:182vertices
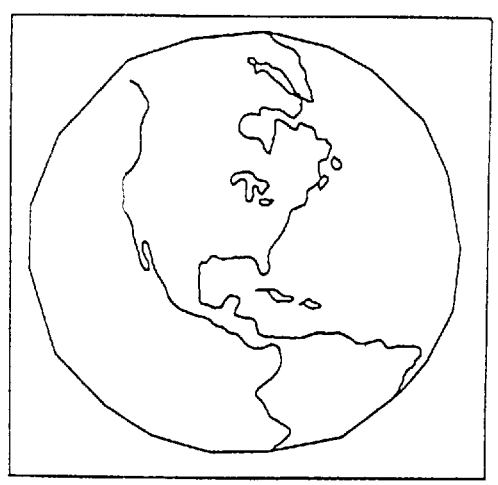
60%:109vertices
36%:66vertices
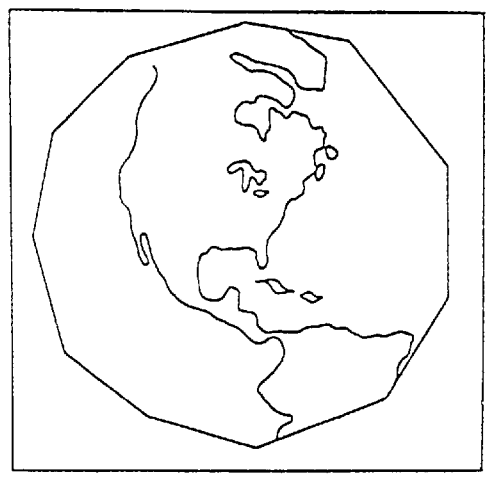
21.6%:39vertices Fig. 13
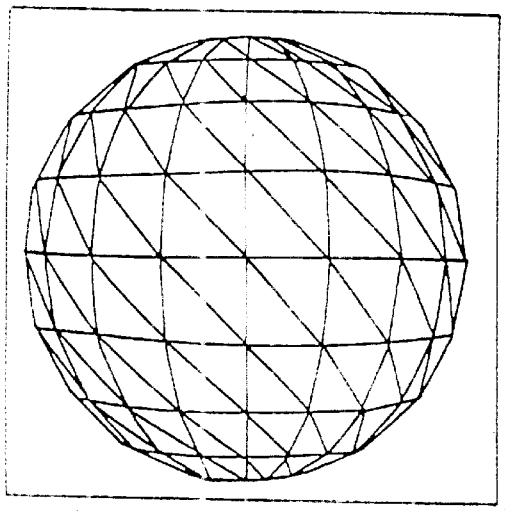
original:182vertices
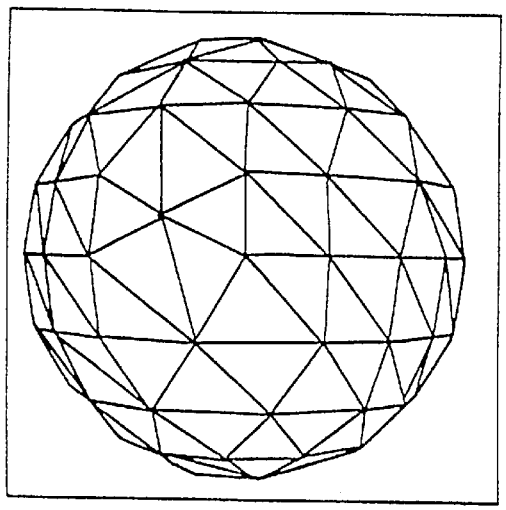
60%:109vertices
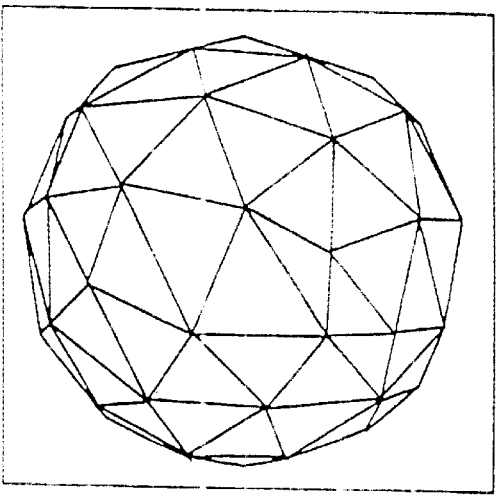
36%:66vertices
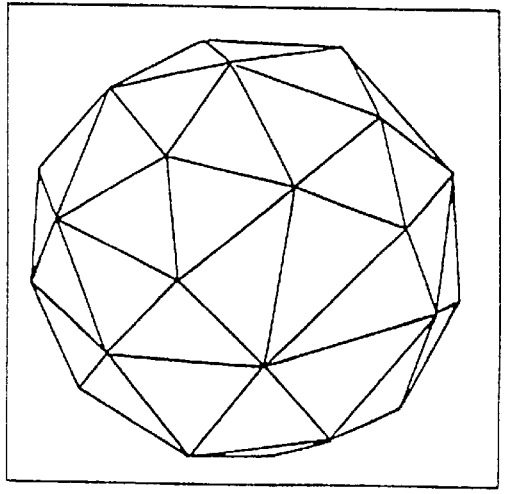
21.6%:39vertices

COMPUTER ANIMATION GENERATOR

This application is a continuation of application Ser. No. 08/755,129, filed on Nov. 25, 1996, now U.S. Pat. No. 5,963,668.

BACKGROUND OF THE INVENTION

1. Field of the Invention

The present invention relates to a method and apparatus for hierarchically approximating shape data with an image, in which the data amount is reduced by reducing the complexity of the shape of a geometric model which is used in generating CG (Computer Graphics), thereby enabling the CG to be drawn at a high rate of speed. The invention also relates to a method and apparatus for hierarchically approximating shape data with an image, which is suitable for use in a game using CG, VR (Virtual Reality), designing, and the like since a shape which was approximated so as not to give a sense of incongruity is changed.

2. Description of the Prior Art

When drawing using a model as part of computer graphics, the same model may be used repeatedly. For example, as shown in FIG. 14, a detailed original model having data of 100% is formed and the CG is drawn on a display by using it repeatedly. When the model is arranged in a far position in a picture plane and is rendered smaller, the same model still is used, and the degree of details of the model is not changed. Therefore, the time required for the drawing depends on the degree of detail of the model and the number of models.

However, when the observer pays no attention to the model because the model is minimized and looks smaller on the picture plane or the model is out of a target point of the picture plane, it is not always necessary to draw by using the model having a high degree of detail. That is, by using a similar model in which a degree of detail is decreased to a certain extent by using a method of reducing the number of vertices of the model, reducing the number of planes of a polygon, or the like, it can appear as if the same model is used. FIG. 15 shows such an example. When the model is to appear at a distance and its size on the picture plane is small, as shown in the example, it is sufficient to draw the CG by using models in which data is reduced to, for example, 50% or 25% from that of the original model and for which the degree of detail is reduced. By using a model having a data amount smaller than that of the original model as mentioned above, a high drawing speed can be realized.

Such an approximation of the model is useful for the drawing of the CG display as mentioned above. However, if the data amount of the model is simply reduced by approximating the details of the model, the observer feels incongruity when he sees the approximated model. If this sense of incongruity can be suppressed, requests for both of the drawing speed and the drawing quality can be satisfied. For this purpose, it is desirable to reduce the data amount in a manner such that a general characteristic portion of the model is left and the other portions are reduced. Hitherto, such an approximation of the model is often executed by the manual work of a designer, so that much expense and time are necessary for the above work.

A method of obtaining a more realistic image by adhering a two-dimensional image to a plane of a model as a drawing target is generally used. This is called a texture mapping, The image that is adhered in this instance is called a texture. When the approximation of the shape as mentioned above is executed to the model which was subjected to the texture mapping, it is necessary to also pay attention to the texture adhered to the model plane. That is, it is necessary to prevent a deterioration in the appearance of the model due to a deformation of the texture shape at the time of approximation and to prevent the occurrence of a problem such that the amount of work is increased since the texture must be again adhered to the approximated model.

In past studies, according to Francis J. M. Schmitt, Brian A. Barsky, and Wen-Hui Du, "An Adaptive Subdivision Method for Surface-Fitting from Sampled Data", Computer Graphics, Vol. 20, No. 4, August, 1986, although the shape is approximated by adhering the Bezier patch to a three-dimensional shape, there is a problem in that a general polygon is not a target.

According to Greg Turk, "Re-Tiling Polygonal Surface", Computer Graphics, Vol. 26, No. 2, July, 1992, a trial of hierarchically approximating a polygon model is executed. There is, however, a problem in that although the algorithm in the above paper can be applied to a round shape, it is not suitable for a square shape and a general shape is not a target. Further, it is not considered to approximate the shape on the basis of characteristic points of the object shape.

Further, according to Hugues Hoppe et al., "Mesh Optimization", Computer Graphics Proceedings, Annual Conference Series, SIGGRAPH 1993, a model is approximated in a manner such that energy is introduced to an evaluation of the approximated model, and operations for removing the edge, dividing the patch, and swapping the edge are repeated so as to minimize the energy. According to the method of the paper, however, it is necessary to execute a long repetitive calculation until the minimum point of the energy is determined. In addition, a solving method such as a simulated annealing or the like is necessary in a manner similar to other energy minimizing problems so as not to reach a local minimum point. There is no guarantee that the energy minimum point is always visually the best point.

Further, in those papers, no consideration is made up to the texture adhered to the model upon approximation. Consequently, the method of approximating the model according to the methods in the papers has a problem in that double processes are required in which the texture is newly adhered to the approximated model after the approximation.

As mentioned above, the past studies have problems regarding the approximation of a model when a polygon is drawn. That is, the conventional method has problems such that application of the shape approximation is limited, a long calculation time is necessary for approximation, and the approximation in which required characteristic points are considered is not executed. The approximation of figure data to realize a switching of continuous layers, in which the sense of incongruity to be given to the observer at the time of the switching of the approximated model is considered, is not executed.

When the approximation is executed to the geometric model to which the texture is adhered, there is a problem in that a measure to prevent a quality deterioration after the approximation, by keeping the shape of the texture adhered to the model, is not taken. There is also a problem in that a measure to eliminate the necessity to newly adhere the texture after the approximation is not taken. Further, there is a problem that the approximation in which the existence of the texture itself is considered is not executed.

OBJECTS AND SUMMARY OF THE INVENTION

It is, therefore, an object of the invention to provide a method and apparatus for hierarchically approximating figure data with an image in the drawing of CG so that high-speed drawing is performed while maintaining a quality of the drawing.

It is another object of the invention to provide a method and apparatus for hierarchically approximating figure data with an image as if the approximation of a geometric model is performed in consideration of the existence of a texture itself.

According to the invention, in order to solve the above problems, there is provided a hierarchical approximating method of shape data for approximating shape data to data of a desired resolution, comprising the steps of: evaluating an importance of each of the edges which construct the shape data; removing an unnecessary edge on the basis of a result of the edge evaluation; and determining a vertex position after the unnecessary edge was removed.

According to the invention, in order to solve the above problems, there is provided a hierarchical approximating method of shape data with an image for approximating shape data to which image data was adhered to data of a desired resolution, comprising the steps of: determining which edge in the shape data should be removed upon approximation; determining a new vertex position in the shape data after the edge removal performed on the basis of the edge removal determination; and removing an unnecessary vertex in the image data adhered to the shape data in accordance with outputs from the edge removal determining step and the vertex movement determining step and moving a vertex on the image data in accordance with the new vertex position in the shape data.

According to the invention, in order to solve the above problems, there is provided an approximating apparatus for figure data for approximating shape data to that of a desired resolution, comprising: evaluating means for evaluating an importance of each of the edges which construct the shape data; edge removing means for removing an unnecessary edge on the basis of a result of the edge evaluation; and vertex position determining means for determining a vertex position after the unnecessary edge was removed.

According to the invention, in order to solve the above problems, there is provided a hierarchical approximating apparatus for figure data with image data for approximating shape data to which image data is adhered to data of a desired resolution, comprising: edge removal determining means for determining which edge in the shape data is removed upon approximation; vertex movement determining means for determining a new vertex position in the shape data after the edge removal; and image data removal and movement determining means for removing an unnecessary vertex in the image data adhered to the shape data in accordance with outputs from the edge removal determining means and the vertex movement determining means and for moving the vertex on the image data in accordance with the new vertex position in the shape data.

According to the invention as mentioned above, the importance of each of the edges of the shape data is evaluated, the unnecessary edge is removed on the basis of the evaluation, a new vertex after the edge removal is determined, and further, the vertex is moved on the image data in accordance with the new vertex position. Thus, the shape data can be approximated so that the change in shape is little while suppressing the deterioration of the image data adhered to the shape model.

The above and other objects and features of the present invention will become apparent from the following detailed description and the appended claims with reference to the accompanying drawings.

BRIEF DESCRIPTION OF THE DRAWINGS

FIG. 12 is a diagram schematically showing an example of a processing result according to an embodiment of the invention;

FIG. 13 is a diagram schematically showing an example of a processing result according to an embodiment of the invention;

DETAILED DESCRIPTION OF THE PREFERRED EMBODIMENTS

Figure 1:
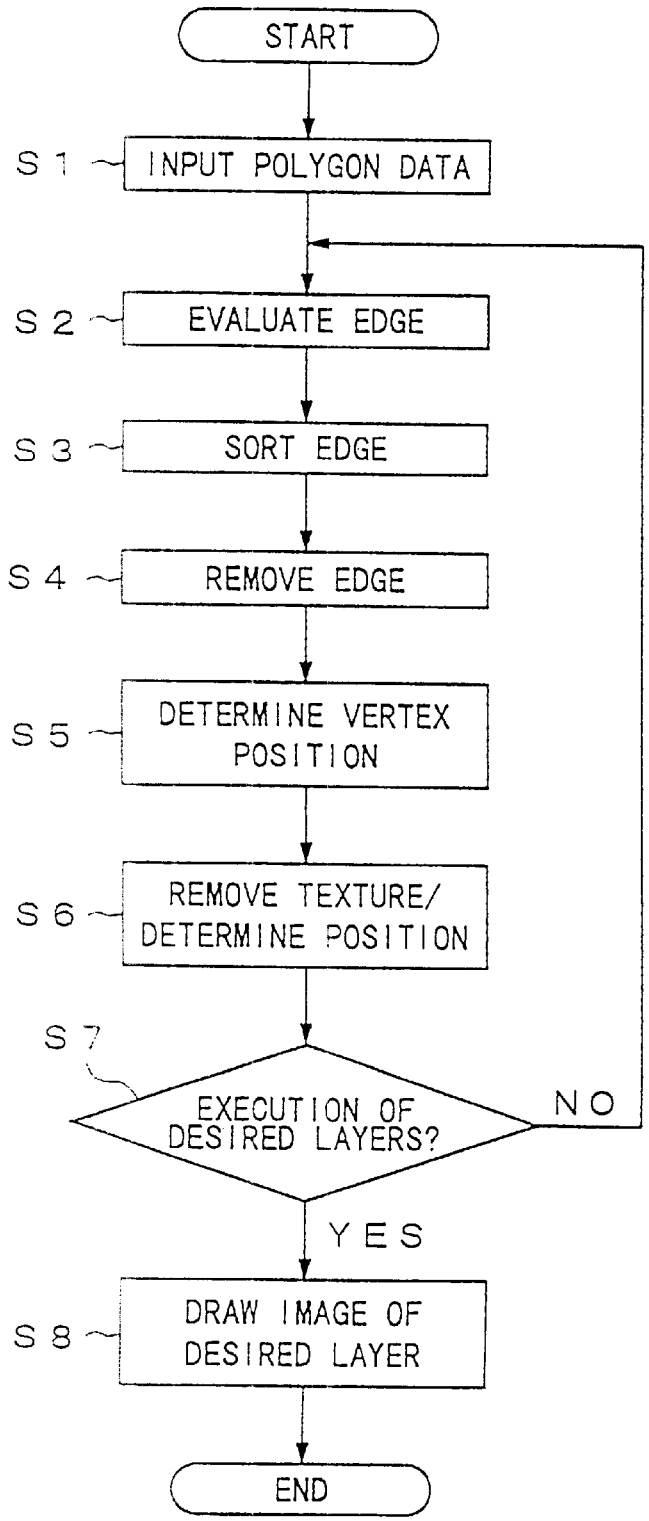
FIG. 1 is a flowchart of a hierarchical approximation of a texture mapped polygon model according to the invention.
Figure 2:
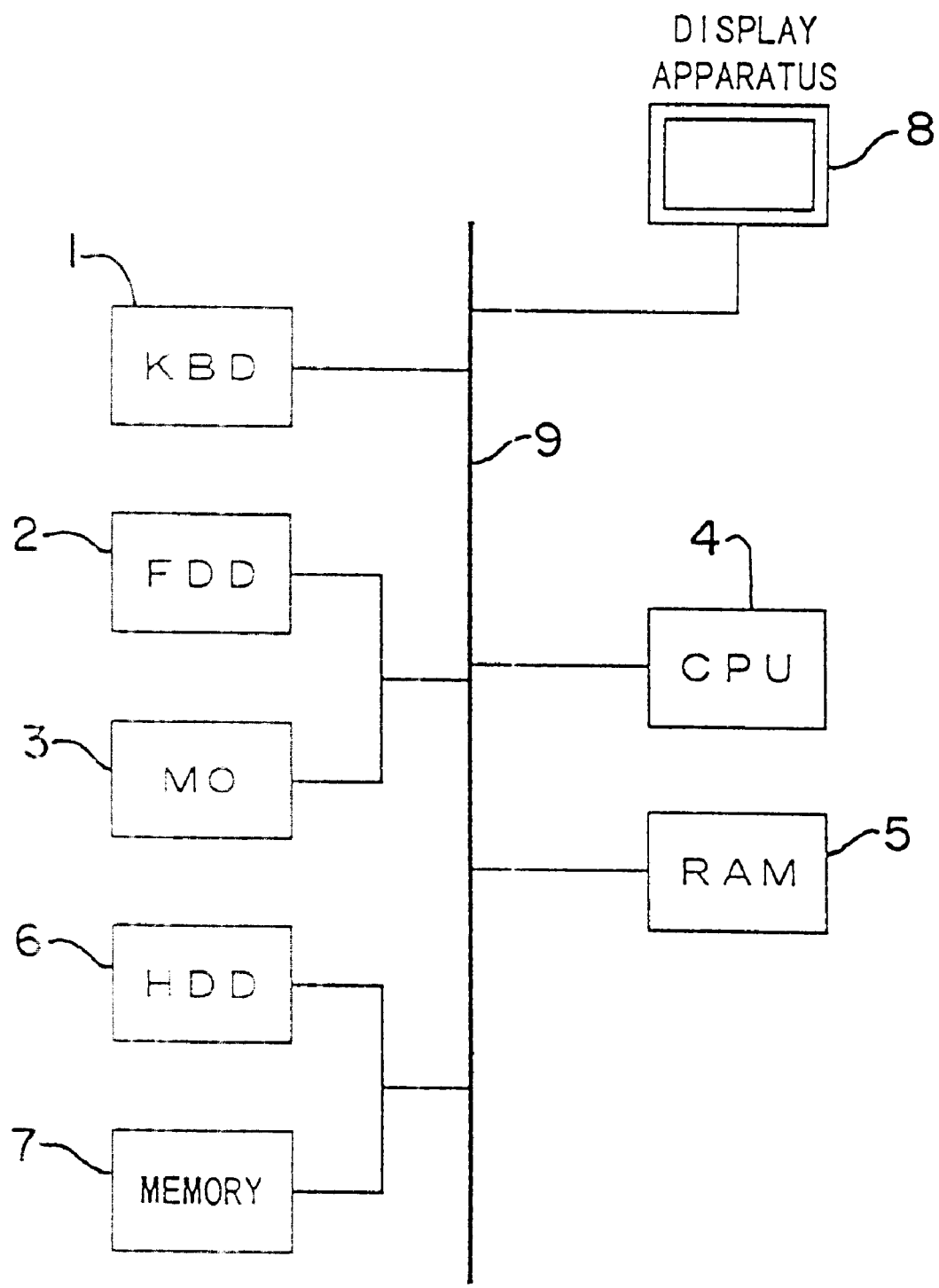
FIG. 2 is a diagram showing an example of a drawing apparatus that can be adhered to the invention.

An embodiment of the invention will now be described hereinbelow with reference to the drawings. FIG. 1 is a flowchart for a hierarchical approximation of a geometric (polygon) model that was subjected to a texture mapping according to the invention. FIG. 2 shows an example of a structure of a drawing apparatus that can execute the processes of the flowchart.

As shown in FIG. 2, the drawing apparatus can be constructed by a computer with a standard structure which comprises: a keyboard 1; a data input device such as floppy disk drive (FDD) 2, magneto-optic disk (MO) drive 3, or the like; a data processing apparatus constructed by a CPU 4, an RAM 5, and the like; an external memory apparatus such as hard disk 6, semiconductor memory 7, or the like; and a display apparatus 8 such as a CRT or the like, and in which those component elements are respectively connected by a bus 9. As an input device, a mouse or the like may also be used. The floppy disk drive 2 and MO drive 3 are also used as data output devices. Further, data can be also supplied from a network such as the internet. The above structure is an example and the actual drawing apparatus can have various constructions.

First, processes in the flowchart shown in FIG. 1 will be schematically described. A texture as image data is allocated and adhered to each plane of a polygon. In the invention, in order to approximate the polygon, edges constructing the polygon are removed and the shape is approximated. Since the shape of the polygon is merely approximated by only removing the edges, in order to approximate the textures allocated to the planes of the polygon, an optimization is executed by integrating the textures associated with the edge removal and moving the coordinates of the textures.

In the first step S1, original polygon data is inputted. The texture is adhered to each plane for the inputted polygon data. The input of the data and the adhesion of the texture are manually performed from the keyboard 1 or by a method whereby data which has been made in another place and stored in a floppy disk or an MO disk is read out by the FDD 2 or MO drive 3. The polygon data can be also inputted through a network such as the internet.

In step S2, each edge of the inputted polygon data is evaluated for performing the edge removal. In the edge evaluation in step S2, each edge of the inputted polygon data is converted into a numerical value by a method, which will be described below, and is set to an evaluation value. In step S3, the evaluation values of the edges obtained in step S2 are sorted and the edge having the minimum evaluation value is selected. The processing routine advances to step S4. In step S4, the edge having the minimum evaluation value that was selected in step S3 is removed.

When the edge is removed in step S4, the processing routine advances to step S5. In step S5, the position of the vertex which remains after the edge was removed in step S4 is determined. In step S6, the texture portion which becomes unnecessary in association with the edge removal is removed and the positions of the remaining texture coordinates are determined.

Approximated polygon data that was approximated at a precision of one stage and was subjected to the texture mapping is obtained by the foregoing processes in steps S2 to S6. The edge removal, the determination of a new vertex, and the process of the texture in association with them are repeated by repeatedly executing the processes in steps S2 to S6. Consequently, the approximated polygon data, which was subjected to the texture mapping can be obtained at a desired precision.

When the approximated polygon data that was subjected to the texture mapping at a desired precision in step S6 is obtained (step S7), the processing routine advances to step S8. The obtained approximated polygon data that was texture mapped is drawn on the display apparatus 8. The obtained approximated polygon data which was texture mapped can be also stored into an external memory apparatus such as a hard disk 6 or memory 7, a floppy disk inserted in the FDD 2, or an MO inserted in the MO drive 3. The derived data can be also supplied and stored to another computer system through the network.

The processes in the above flowchart are executed mainly by the CPU 4 in the hardware structure of FIG. 2. Instructions or the like which are necessary during the processes are sent from the input such as a keyboard 1 or the like to the CPU 4.

Processes regarding a model approximation will now be described. As mentioned above, the approximation of the polygon model is executed by repeating the edge removal. In this instance, small convex and concave components which do not contribute to the general shape of the model are judged and edges which should be preferentially removed are determined on the basis of the judgement result. In order to select the edges which are preferentially removed, the extent to which the edges constructing the model contribute to the general shape, namely, the importance of each edge is evaluated and the removal is executed to remove the edge with the smallest evaluation value. In step S2, the importance of each edge is evaluated.

Figure 3A:
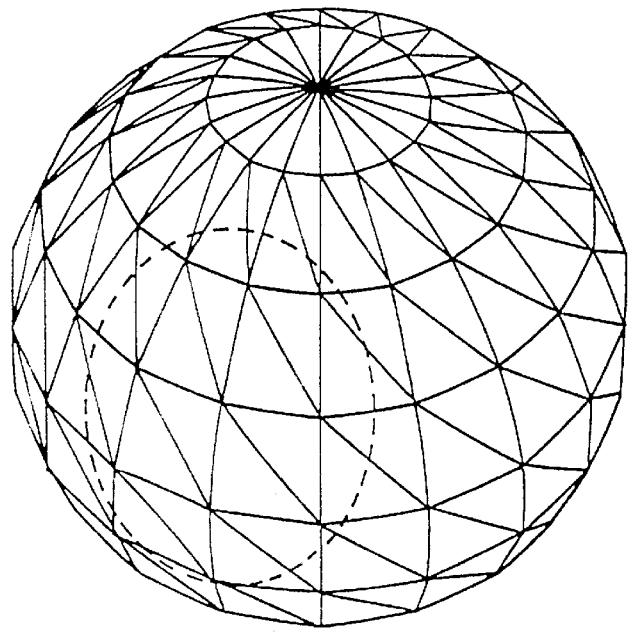
FIGS. 3A and 3B are schematic diagrams for explaining equation (1)
Figure 3B:
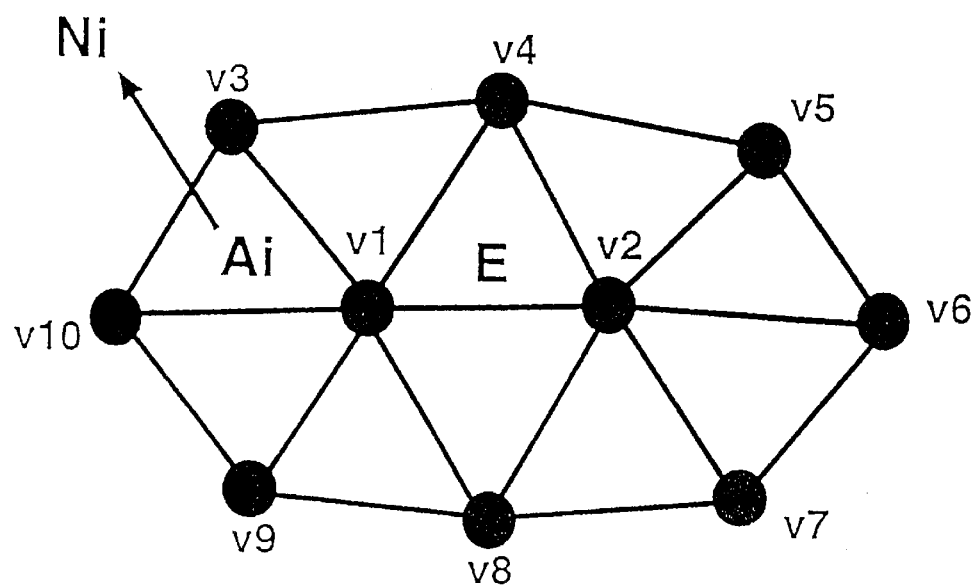

In order to select the edge which is suitable to be removed by obtaining the evaluation value, an evaluation function to evaluate the extent to which each of the edges constructing the polygon model contributes to the shape of the polygon model is introduced. The following equation (1) shows an example of the evaluation function. FIGS. 3A and 3B are diagrams for explaining the equation (1).

$$F(e) = \sum_i |aV_i + bS_i| \qquad (1)$$

where $V_i = (N_i \cdot E) \times A_i$ $S_i = |E| \times A_i$

FIG. 3B shows an example in which a part of a spherical polygon model shown in FIG. 3A in which each plane is bounded by a triangle is enlarged. By the equation (1), an edge e constructed by two vertices $v_1$ and $v_2$ is evaluated. With respect to the vertices $v_1$ and $v_2$ bounding the edge $e(v_1, v_2)$, when sets of planes including them as vertices assume $S(v_1)$ and $S(v_2)$, a range of i is set to $S(v_1) \cup S(v_2)$. That is, $1 \leq i \leq 10$ in the example shown in FIG. 3B. In the diagram, E denotes a vector having the direction and length of the edge e; $N_i$ denotes a unit normal vector of each plane; $A_i$ denotes an area of the plane; and |E| a length of the vector E.

The equation (1) is constructed by two terms. The first term $V_i$ shows a volume amount which is changed when the edge as an evaluation target is removed. The volume amount here denotes a virtual volume of a shape specified by the shape data of the polygon. The second term $S_i$ shows a value obtained by multiplying the planes existing on both sides of the target edge with the length of the target edge. It denotes a change amount of the volume of the plane including only the target edge. Coefficients a and b are multiplied to the two terms. The user can select which one of the first term $V_i$ and the second term $S_i$ is preferentially used by properly setting the values of the coefficients.

The first term $V_i$ largely depends on the peripheral shape of the edge as an evaluation target. On the other hand, the second term Si depends on the length of the target edge and the area of planes existing on both sides of the target edge. In the case of a polygon model having a flat shape like a sheet of paper, when the edge $e(v_1$ and $v_2)$ is removed, the change amount by the term $S_i$ is larger than that by the term $V_i$. In the polygon model constructed by planes in which all of them have similar shapes and areas, for example, in the model shown in FIG. 3A, the change amount by the term $V_i$ is larger than that by the term $S_i$.

The value of the equation (1) is calculated with respect to each of the edges constructing the polygon model and the evaluation value for each edge is obtained. In step S3, the calculation values are sorted in accordance with the values and the edge having the minimum evaluation value is selected, thereby obtaining the edge whose contribution to the model shape when the edge is removed is the smallest.

When the importance of the edge is evaluated in step S2, the length of edge is considered. When the evaluation values are the same, the shorter edge can be also set as a target to be removed.

Although the local evaluation value in the polygon model is obtained by the equation (1), each edge can be also evaluated by a value obtained by adding the evaluation values of the peripheral edges to the evaluation value of a certain target edge. In this case, the evaluation can be performed not only with the peripheral shape of one edge but also with the shape or a wide range. When the area which the user wants to evaluate is wide as mentioned above, the calculation range of the equation (1) can be widened in accordance with such a wide area.

In addition to the evaluation value simply derived by the calculation of the equation (1), the user can give the evaluation value or can operate the evaluation value. Therefore, when there is a portion which the user wants to leave intact without approximation or a portion which he, contrarily, wants to approximate, the intention of the designer or operator can be reflected in the approximating process by designating such a portion. In this case, the evaluation value is determined by executing a weighted addition by giving a weight coefficient to each of the value operated by the user and the calculated evaluation value.

In this case, the approximation in which the intention of the designer is reflected can be performed by giving a weight coefficient, for example, by giving weight to the evaluation value designated by the user. On the contrary, when a large weight is given to the evaluation value obtained by the calculation of the equation (1), an accurate approximation can be performed by a quantitative evaluation of the volume change in shape. In this manner, the change in shape can be freely controlled by the weighting process.

When the evaluation values for the edges of the polygon data are obtained in step S2 as mentioned above, the obtained evaluation values are sorted and the edge having the minimum evaluation value is selected in step S3. When sorting the edges, for example, a quick sorting as a known technique can be used. Other sorting methods can be also obviously used. Since the sorting methods including the quick sorting are described in detail in "Algorithm Dictionary" published by Kyoritsu Publication Co., Ltd. or the like, the description is omitted here. The selected edge having the minimum evaluation value is removed in step S4.

Although the case where the edge having the minimum evaluation value is simply removed has been described here, the removing order of the edges or the edge which is not removed can be also arbitrarily designated. When the edge is not removed, there is no change in shape of such a portion. For example, in the case where it is desirable that the shape is not changed, like a portion in which two models are in contact each other, it is sufficient to set a portion where no edge is removed.

Figure 4A:
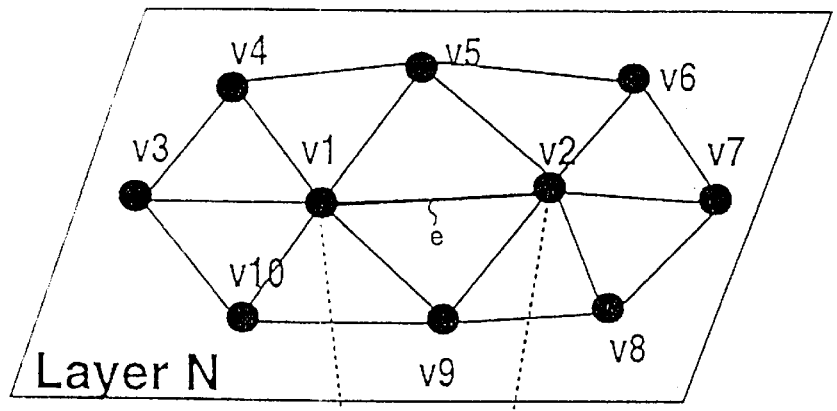
FIGS. 4A and 4B are schematic diagrams showing an example of a vertex position decision.
Figure 4B:
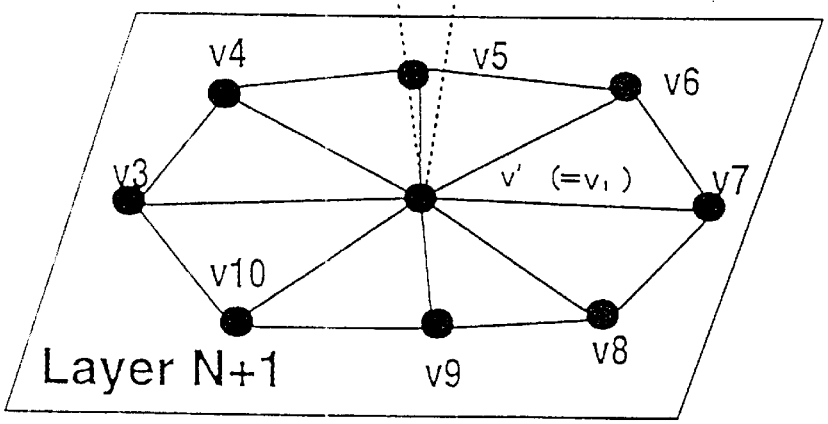

When the edge is removed in step S4, the vertices ($v_1$ and $v_2$ in this case) constructing the edge are lost. In step S5, therefore, a new vertex position in association with the edge removal is determined. FIGS. 4A and 4B show examples of the vertex position determination. After the edge was removed, either one of the two vertices constructing the edge is left. In this case, the edge $e(v_1$ and $V_2)$ in a layer N in FIG. 4A is removed, thereby obtaining a layer (N+1) shown in FIG. 4B. The vertex $v_1$ remains and becomes a new vertex v'.

Figure 5A:
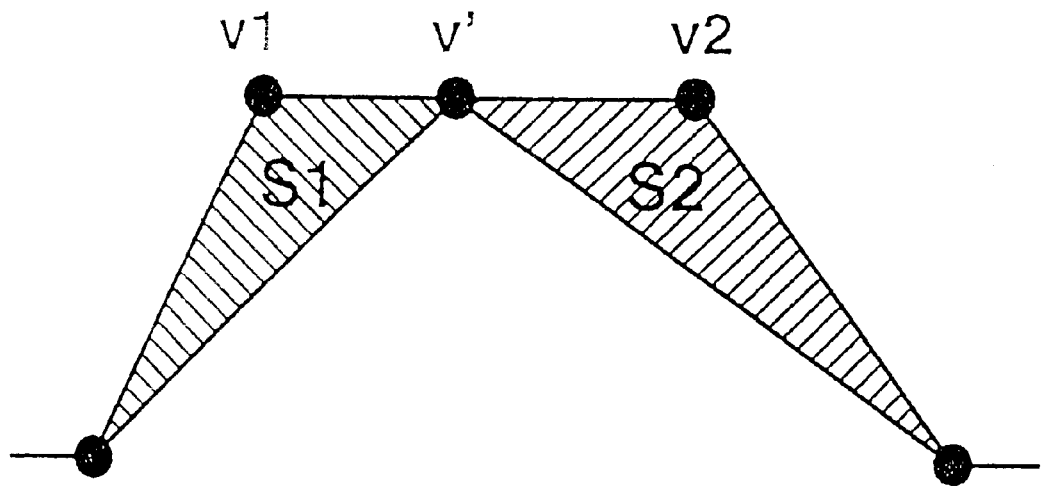
FIGS. 5A and 5B are schematic diagrams showing an example of a method of determining a position at which a vertex to be left is put.
Figure 5B:
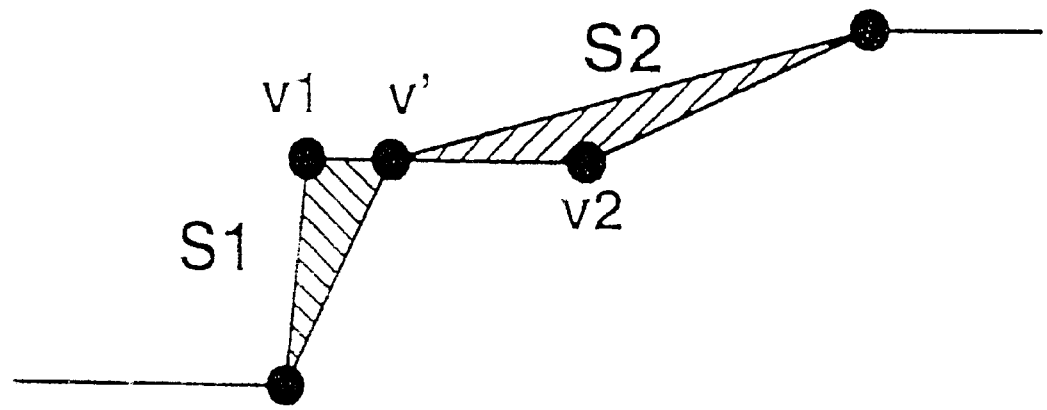

In this instance, the shape after the edge removal is changed depends on the position of the vertex $v_1$ which remains. FIGS. 5A and 5B show examples of a method of determining the position where the vertex to be left is located. FIGS. 5A and 5B show cross sectional views of an edge shape in the polygon data. That is, FIG. 5A shows a case where the edge $e(v_1, v_2,)$ bounded by the vertices $v_1$ and $v_2$ is formed in a convex shape including the outer edges of $v_1$ and $v_2$. FIG. 5B shows a case where the edge $e(v_1, v_2,)$ is between the upper and lower directions of the outer edges of $v_1$ and $v_2$ forming an S shape. In FIGS. 5A and 5B, v' indicates a vertex to be left.

In FIGS. 5A and 5B, areas $S_1$ and $S_2$ shown by hatched regions show volume change amounts when the edge $e(v_1, v_2)$ is removed and the vertex v' is left. The vertex v' which is left after the edge $e(v_1, v_2)$ was removed is positioned where the volume change amount $S_1$ on the vertex $v_1$ side and the volume change amount $S_2$ on the vertex $V_2$ side are equal. By arranging the vertex to the position where the volume change amounts on both sides of the removed edge $e(v_1, v_2)$ are equal as mentioned above, the shape after the edge removal can be approximated to the original shape.

Although the vertex $v_1$ which is left and becomes a new vertex is arranged to the position where the volume change amounts on both sides of the edge are equal irrespective of the peripheral shape of the edge which is removed in step S5 in the above description, the invention is not limited to the example. For example, the vertex v' can be also arranged at a position where the volume change upon edge removal is the minimum. As mentioned above, the method of arranging the vertex v' to the position where the volume change amounts on both sides of the edge are equalized and the method of arranging the vertex v' to the position where the volume change is the minimum can be selectively used in accordance with a desire of the user.

In consideration of the peripheral shape of the edge, when the shape has a concave or convex shape, the vertex v' can be also arranged at a position where the volume change after the edge removal is the minimum. When the periphery has an S-character shape, the vertex v' can be arranged at a position where the volume change amounts on both sides of the edge are equalized. In this case, the position of the vertex v' is deviated to either one of the ends of the edge in the case of the concave or convex shape. In case of the S-character shape, the vertex v' is arranged in the middle of the S character. Thus, both of an effect to suppress the volume change and an effect to absorb the continuous changes like an S character by the plane can be achieved.

For example, an area having a small S-character shape like a saw tooth can be approximated by one plane in a general shape. A portion having a large change except the S-character shape can be approximated by a shape which is closer to the original shape. In the approximation in which the shape has a priority, such a setting is also possible. The approximating methods can be selectively used in accordance with the intention of the user.

It is also possible not to change the vertex position remaining after the edge removal from the vertex position before the edge removal. That is, in the example shown in FIGS. 4A and 4B, after the edge $e(v_1, v_2)$ was removed, only the vertex $v_1$ is left as a new vertex v' without changing the position from the position before the removal. This is effective means when it is desirable not to move the position of a target vertex because the target vertex exists at a contact point with the other model or the like.

Figure 6A:
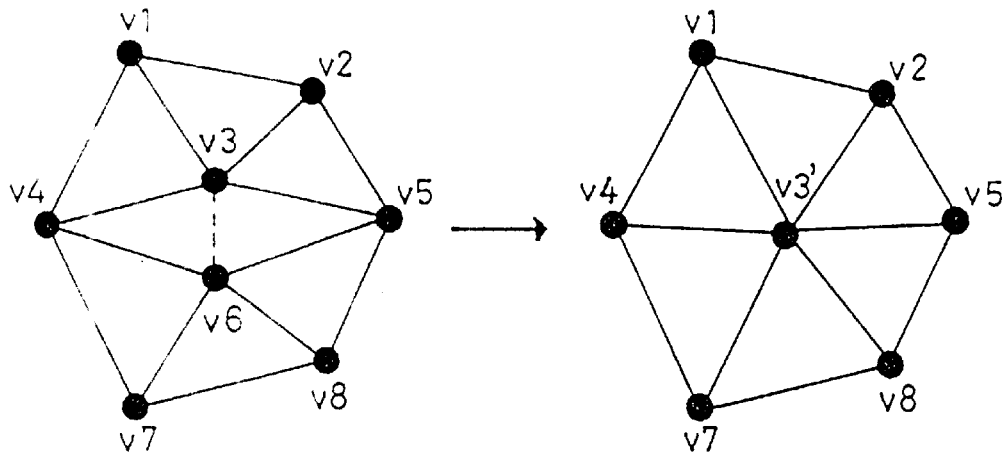
FIGS. 6A and 6B are diagrams schematically showing an example in which a texture is allocated on a certain plane of a polygon model.

When the edge is evaluated and removed and the new vertex in association with the edge removal is determined in the steps up to step S5, a process regarding the texture adhered to each plane of the polygon model is executed in step S6. FIGS. GA and 6B schematically show examples in which image data (texture) is allocated to a certain plane on the polygon model. FIG. 6A shows a polygon model itself comprising vertices $V_1$ to $V_8$. It shows that when an edge $e(V_3, V_6)$ shown by a broken line is removed from the model shown in the left diagram, the model is approximated to a shape shown in the right diagram.

Figure 6B:
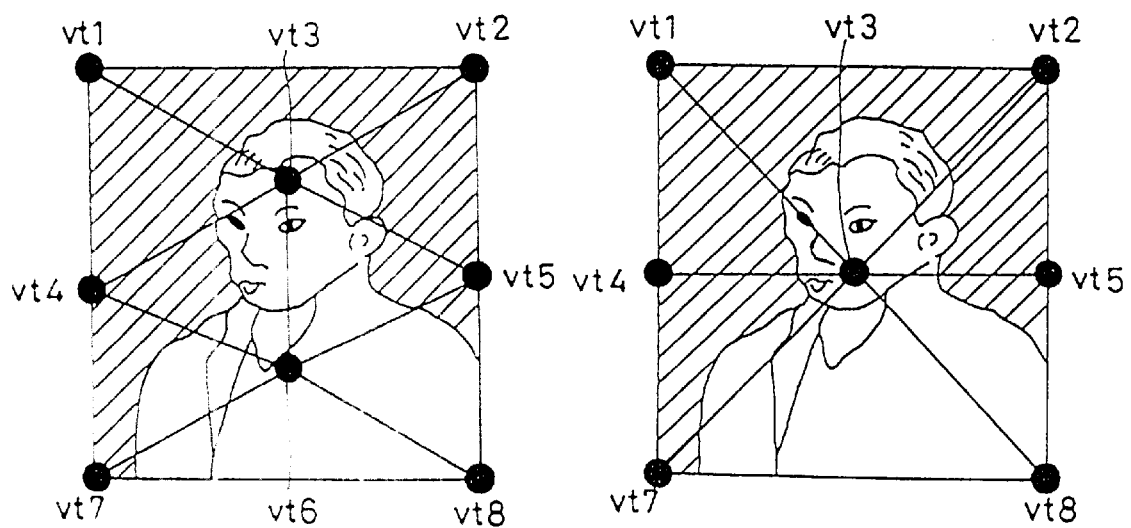

FIG. 6B shows a state in which a texture is adhered to the polygon model shown in FIG. 6A. In this instance, for easy understanding, image data based on a portrait is used as a texture. Coordinates $vt_1$ to $vt_8$ in FIG. 6B correspond to the vertices $v_1$ to $v_8$ in FIG. 6A, respectively. FIG. 6B, therefore, shows that the coordinates $vt_1$ to $vt_8$ in the diagram on the left side are changed as shown in a diagram on the right side in association with the removal of the edge $e(V_3, V_6)$ in FIG. 6A.

The vertex $V_6$ is removed by the approximation of the polygon model and the two vertices $v_3$ and $v_6$ in this model are integrated to one vertex $V_3$. In association with it, by removing the edge $e(v_3, v_6)$ comprising $v_3$ and $v_6$, triangular areas on both sides including the removed edge are lost. In this instance, unless the loss of those triangular areas is considered, the image data comprising the texture coordinates $Vt_3$, $Vt_4$, and $Vt_6$ and the image data comprising $Vt_3$, $vt_5$, and $Vt_6$ are lost.

As shown by the texture in the diagram on the right side in FIG. 6B, therefore, it is necessary to execute an integration and a position movement to the texture in accordance with the approximation of the edge removal. Thus, the continuous image data on the approximated model surface can be reproduced.

In this example, the vertices $v_3$ and $v_6$ are integrated on the polygon model and the vertex $v_3$ remains. The remaining vertex $V_3$ is set to a vertex $V_3'$. The position of the vertex $V_3'$ is arranged at a predetermined distribution ratio t on the coordinates between the edge $e(v_3, v_6)$ comprising $V_3$ and $v_6$ before approximation. In this case, the coordinates of the vertex $v_3'$ can be calculated by $((1-t) \times V_3 + t \times V_6)$. When $0 \leq t \leq 1$, the distribution coefficient t exists on the edge straight line of the edge $e(v_3, v_6)$ before approximation and, when t<0 or 1<t, t exists out of the edge $e(v_3, v_6)$. By changing a value of t, therefore, a shape change amount after the model was approximated by the edge removal can be controlled.

As mentioned above, the vertices $v_3$ and $v_6$ are integrated on the polygon model and are set to the vertices $v_3'$ and $V_3'$ is arranged between the vertex $v_3$ and the vertex $v_6$. The texture coordinates $vt_3$ and $vt_6$ corresponding to those two vertices are, therefore, also integrated to the coordinates $Vt_3$ after approximation and are set to coordinates $vt_3'$. The coordinates $vt_3'$ are arranged between the coordinates $Vt_3$ and $vt_6$ before approximation.

Figure 7A:
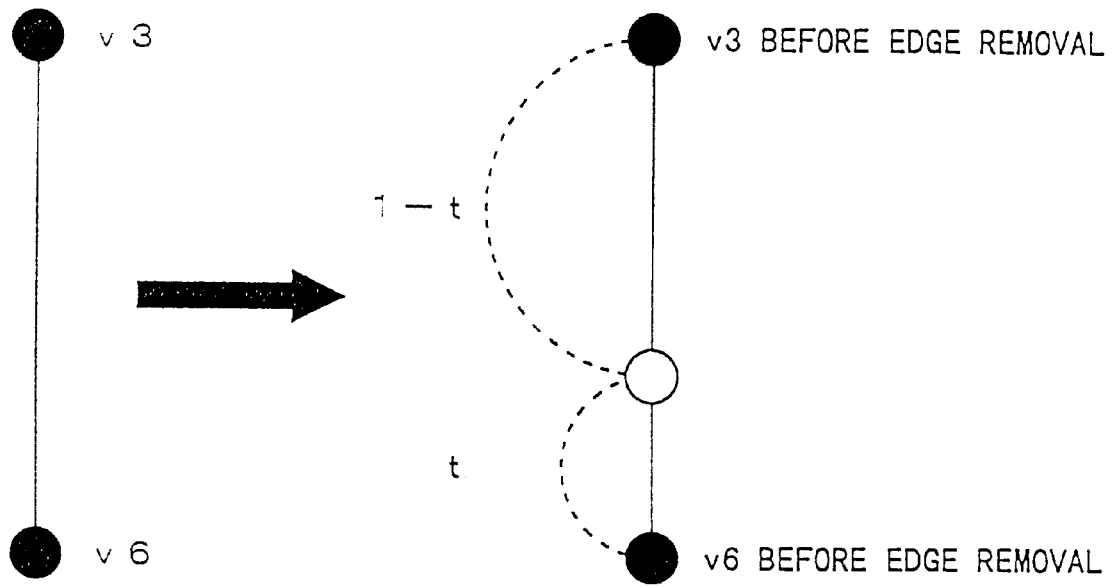
FIGS. 7A and 7B are diagrams schematically showing an integration of vertices and texture coordinates in association with an edge removal.
Figure 7B:
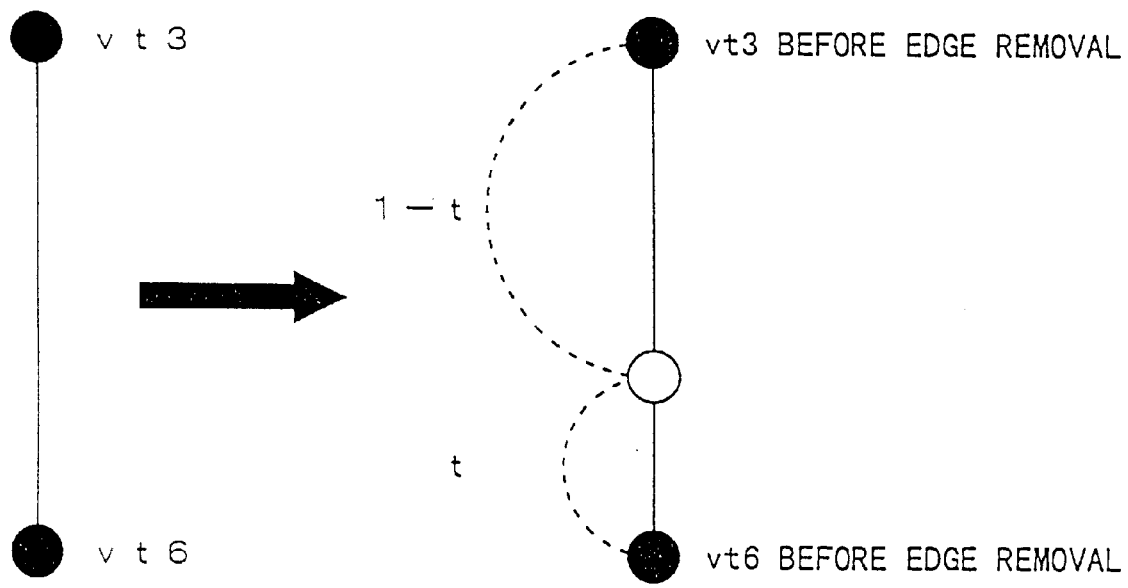

FIGS. 7A and 7B schematically show the integration of vertices and the integration of texture coordinates in association with the edge removal. FIG. 7A shows an example in which the integrated vertex $V_3'$ is arranged to the position calculated by $((1-t) \times v_3 + t \times v_6)$ in association with the removal of the edge $e(v_3, v_6)$. A distribution of the remaining texture coordinates can be obtained in a manner similar to the arrangement of the vertex $v_3'$ based on the distribution t. That is, as shown in FIG. 7B, as for the distribution of the remaining texture coordinates $Vt_3'$, by calculating $((1-t) \times Vt_3 + t \times Vt_6)$ in a manner similar to the distribution t between the above vertices $v_3$ and $v_6$, an image can be distributed in a form according to a change in model shape to which the image is adhered. Thus, as shown in the diagram on the right side of FIG. 6B, the textures can be continuously adhered to the polygon model.

In this instance, when the position of the coordinates $Vt_3$ of the texture data corresponding to the vertex $V_3$ on the polygon model is not changed in accordance with the change in model shape as mentioned above, for example, in the texture shown in FIG. 6B, an image existing at the position of the face corresponding to the triangular plane including the removed edge $e(V_3, V_6)$ cannot be adhered to the model.

Figure 8A:
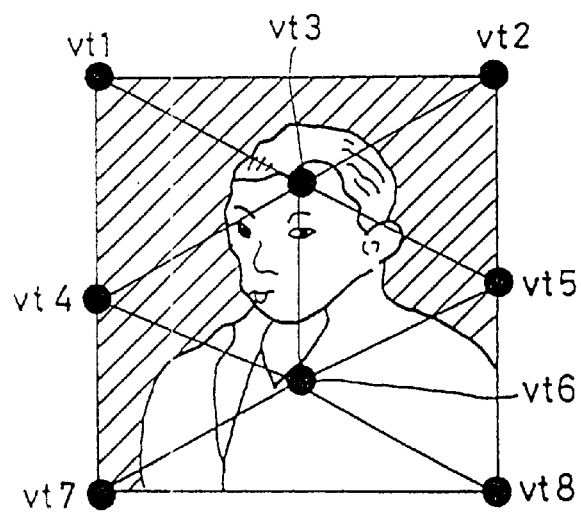
FIGS. 8A to 8C are diagrams for explaining that the texture is changed by the integration of the vertices.
Figure 8B:
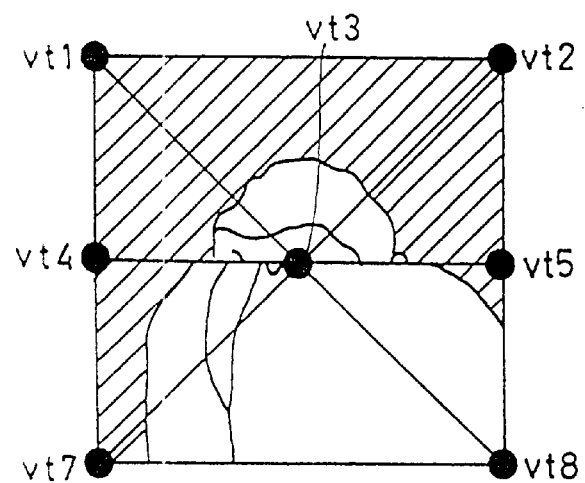
Figure 8C:
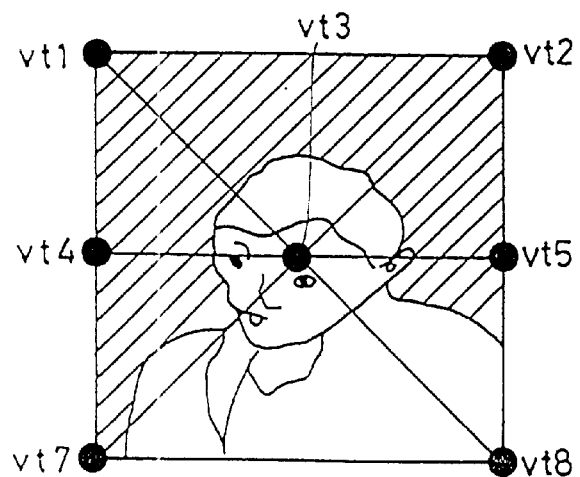

With respect to an original polygon model shown in FIG. 8A, for example, when the coordinates $vt_6$ on the texture allocated to the vertex $v_6$ are made correspond to the remaining vertex $V_3$ side from the integration relations of vertices after the removal of the edge e without considering the image data allocated to the triangular plane which disappears at the time of the removal of the edge $e(V_3, V_6)$, the portion of the face disappears as shown in FIG. 8B. Further, when the coordinates of $Vt_3$ before the edge removal are succeeded as they are after the edge removal without considering the integration relation of the vertices at the time of the removal of the edge e, as shown in FIG. 8C, since the coordinates of the vertex $v_3$ change after the removal of the edge e and an area of each plane changes, the resultant image to which the texture was adhered is distorted. That is, the texture data also needs to be changed in accordance with the change in plane and change in model vertex position due to the edge removal.

When the texture is adhered to the polygon model, there is a case where not only one texture but also a plurality of different textures are allocated to the model. In this case, a boundary in which the texture is switched from a certain texture to another texture exists.

In case of adhering the texture to the polygon model, as mentioned above, the texture is allocated to each vertex of the model. Even in the boundary of the texture, therefore, the boundary is allocated to each vertex constructing the edge of the model. Further, as mentioned above, the approximation of the model is performed by repeating the edge removal only a desired number of times. In this instance, if the texture area allocated to the edge as a target of the removal is in the texture, as shown in FIGS. 6 and 7 mentioned above, the model can be approximated while holding a continuity of the image.

However, when the area of the image allocated to the edge as a removal target exists just on the boundary of the image, the polygon model is approximated by the edge removal and since the vertex position is moved, a plurality of textures are mixed and the appearance of the texture is broken. To prevent this, it is necessary to make a discrimination so as not to break the image boundary at the time of the edge removal and to decide sizes of a change of the outline portion by the edge removal.

Figure 9A:
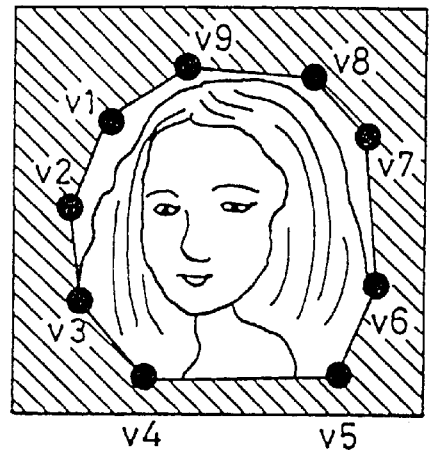
FIGS. 9A to 9D are diagrams for explaining a case where two different textures are adhered to one polygon.
Figure 9B:
Figure 9C:
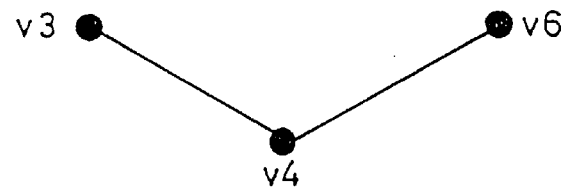

As shown in FIG. 9A, two different textures comprising an image of a hatched portion and an image of a face are both adhered to one polygon model. FIG. 9B shows a certain continuous edge train in the model shown in FIG. 9A. In the model shown in FIGS. 9A and 9B, for example, when the edge $e(v_4, v_5)$ comprising the vertices $v_4$ and $v_5$ is removed and the vertex $v_4$ is left after the removal, when executing a process to arrange a vertex $v_4'$ based on the vertex $v_4$ to the middle position of the edge $e(v_4, v_5)$ as a removal target, an outline portion of the edge changes as shown in FIG. 9C.

Figure 9D:
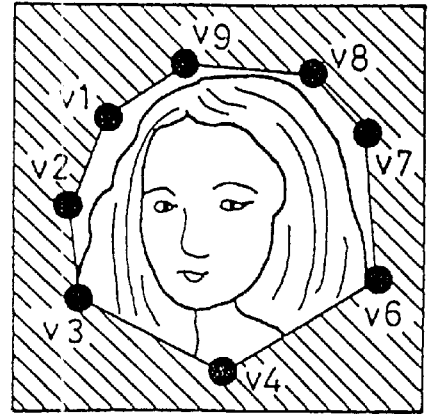

In this case, since the outline portion of the face image has also been adhered to each of the vertices $v_3$ to $v_6$, as shown in FIG. 9D, the shapes of the two adhered images are broken. In this example, the shape of the lower portion of the face picture is largely changed and the image of the hatched region increases. As mentioned above, in the edges of the model to which the outline portion of the image is allocated, if the edge removal is simply repeated as mentioned above, the quality after the approximation is deteriorated.

Figure 10:
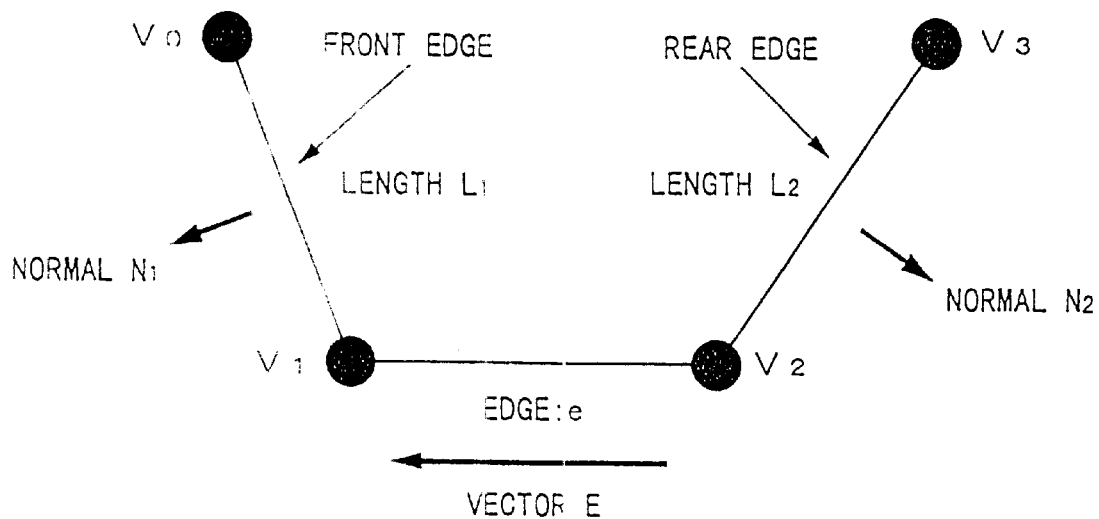
FIG. 10 is a schematic diagram for explaining an equation (2)

To prevent this, a removal evaluating function of the edge as a boundary portion of the texture is introduced and when the shape of the texture boundary is largely changed by the edge removal, it is necessary to use any one of the following methods. Namely, as a first method, the relevant edge is not removed. As a second method, although the edge is removed, a movement amount of the vertex position after the removal is adjusted. The following equation (2) is used as a removal evaluating function of each edge in this instance. FIG. 10 shows a diagram for explaining the equation (2).

$$F(e) = \sum_i |(N_i \cdot E) \times L_i| \quad (2)$$

In the equation (2), E denotes the vector having the direction and length of the edge e, Ni indicates the normal vector of the edge, and Li the length of edge. A range of i corresponds to the whole edge of the boundary lines existing before and after the edge as a removal target. The equation (2) denotes an area change amount when the edge of the boundary portion is removed. Therefore, when the calculation value of the equation (2) is large, a change of the outline portion by the edge removal is large.

Namely, when the calculation value of the equation (2) is large, the area change in the outline portion of the texture increases, so that there is a fear of occurrence of the breakage of the texture shape. To prevent this, there is a method whereby the relevant edge is not removed like the foregoing first method. However, like the foregoing second method, there is also a method whereby the texture coordinates after the edge removal are moved within a range where the value of the equation (2) is smaller than the designated value, thereby consequently decreasing the change amount of the outline portion. By using the second method, the breakage of the texture after the approximation can be suppressed.

As mentioned above, the approximated polygon model to which the texture having a desired precision is adhered can be obtained. In this case, when the texture is adhered to the original model, there is no need to again adhere the texture to the model after completion of the approximation and the approximated model with the texture can be automatically obtained.

As mentioned above, the approximated model obtained by repeating the processes in steps S2 to S6 is stored in the external storing apparatus such as hard disk 6 or memory 7. However, when displaying in step S8, the approximated model stored in the external storing apparatus is read out, drawn, and displayed to the display apparatus 8. As already described in the foregoing prior art, in this display, for example, when the model is displayed as a small image on the picture plane because it appears at a remote location or when the observer fails to notice the model because it is out of the target point on the picture plane, the model is switched to the model of a layer that was approximated and the image is displayed.

Upon switching to the approximated model, if the model is suddenly switched to the model in which a degree of approximation largely differs, a sudden change occurs in the shape of the displayed model at a moment of the switching and a feeling of disorder is given to the observer.

To prevent that feeling of disorder, it is sufficient that a number of models whose approximation degrees are slightly changed are prepared and stored into the external storing apparatus and the display is performed while sequentially switching those models. In this case, however, since an amount of models to be stored increases, it is not efficient. Therefore, to realize a smooth continuous conversion even with a small number of models, it is sufficient to interpolate the model among the discrete layers and to obtain the model of the middle layer.

For example, in the example shown in FIGS. 4A and 4B mentioned above, the vertex after the edge $e(v_1, v_2)$ was removed is set to v'. However, as for the vertex v', it is considered that the vertices $v_1$ and $v_2$ in the edge $e(v_1, v_2)$ approach each other and become the vertex v'. Namely, the vertices $v_1$ and $v_2$ are consequently integrated to the vertex v'. As mentioned above, since the correspondence relation of the vertices before and after the edge removal is known, the data between the data before and after the edge removal can be obtained by an interpolation from the data before and after the edge removal by using the correspondence relation of the vertices.

Such a forming method of the approximated model in the middle layer between the discrete layers has already been described in detail in Japanese Patent Application No. 6-248602 regarding the proposition of the present inventors.

Figure 11A:
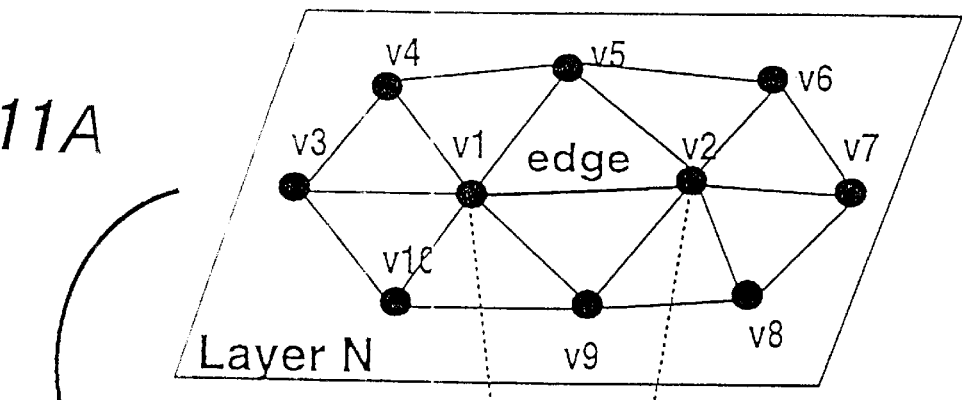
FIGS. 11A to 11C are schematic diagrams showing examples of a method of forming an approximate model of a middle layer.
Figure 11B:
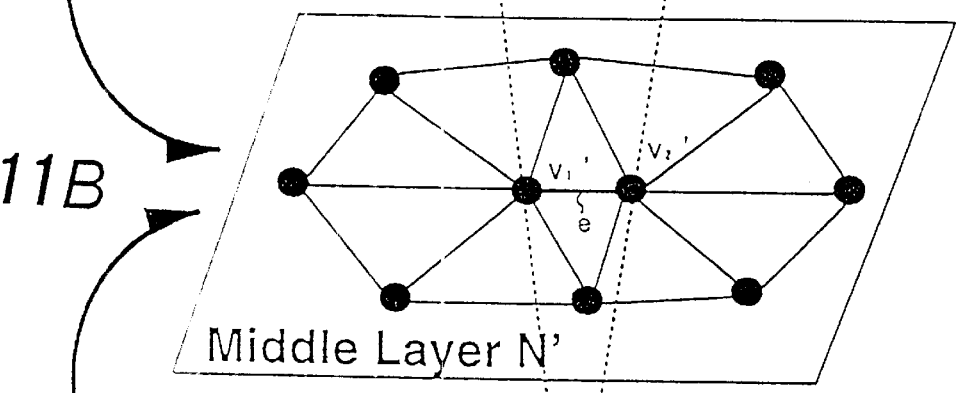
Figure 11C:
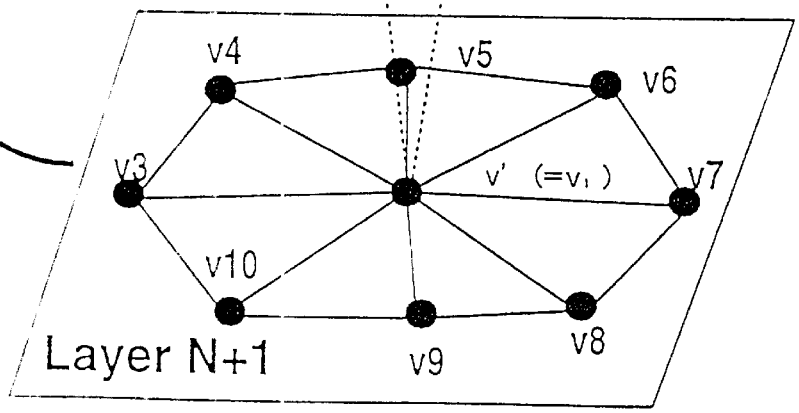
Figure 14:
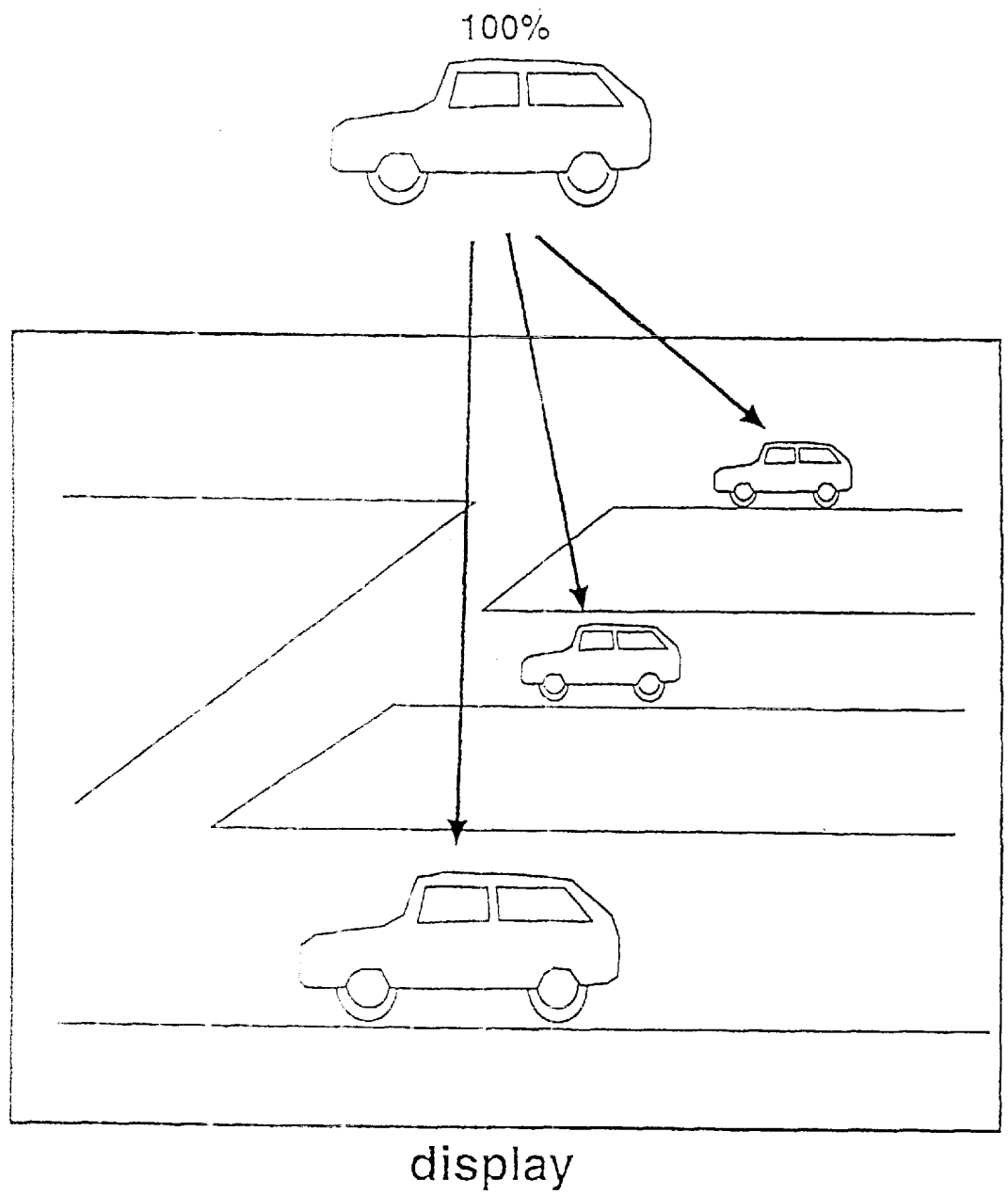
FIG. 14 is a schematic diagram showing an example of a CG drawing according to a conventional method.
Figure 15:
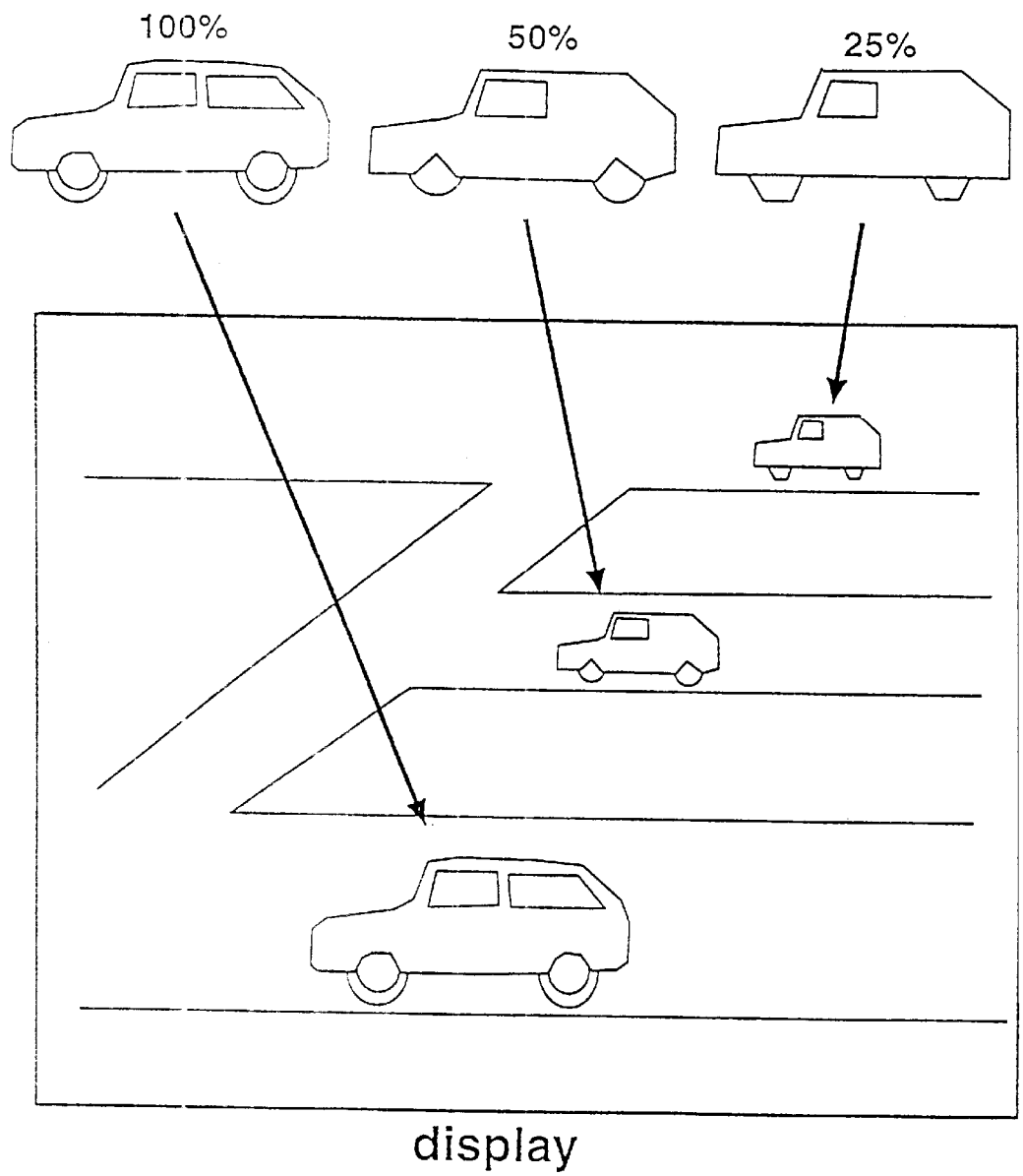
FIG. 15 is a schematic diagram showing an example of a desirable CG drawing.

FIGS. 11A to 11C show the formation of the approximated model of the middle layer using the correspondence relation of the vertices between two layers as mentioned above. In FIGS. 11A to 11C, a layer before the edge removal is set to a layer N as shown in FIG. 11A and a layer after the edge removal is set to a layer N+1 as shown in FIG. 11C, thereby obtaining a model of a middle layer N' shown in FIG. 6B from those two layers.

In the example, the vertices $v_1$, and $v_2$ bounding the edge $e(v_1, v_2)$ of the layer N are integrated to $v_1$ in the layer N+1 and the deleted vertex $v_2$ is integrated to $v_1$. From the correspondence relation of the vertices, in the middle layer N', the positions of vertices $v_1'$ and $V_2'$ bounding an edge $e'(v_1', V_2')$ corresponding to the edge $e(v_1, v_2)$ of the layer N can be obtained by the linear interpolation between the layers N and N+1. Although the example in which one middle layer is obtained is shown here, a degree of linear interpolation is changed in accordance with a desired number of middle layers and a plurality of middle layers can be obtained. The formation of the approximated model of the middle layer can be performed in a real-time manner in accordance with a situation in which the model is displayed.

Although the case where the approximated model of the middle layer is formed and displayed in a real-time manner while displaying the model has been described here, the invention is not limited to such an example. For instance, it is also possible to practice the invention in a manner such that the approximated model of the middle layer is previously formed and stored in the external storing apparatus and the stored approximated model of the middle layer is read out at the time of the display.

Although the case where one edge is removed has been mentioned as an example here, since the edge removal is repeated a plurality of number of times in the approximation of the actual model, one vertex of a certain layer corresponds to a plurality of vertices of another layer which is closer to the original model. By using the correspondence relation of the vertices in those two layers as mentioned above, the vertices of the model can be made to correspond among all of the layers. The model of the middle layer is obtained on the basis of the correspondence relation of the vertices derived as mentioned above.

As mentioned above, since the coordinates of the image data in the texture are allocated to each vertex of each model, in a manner similar to the case of the vertices of such a model, the model to which the texture was adhered in the middle layer can be obtained by the interpolation of the texture coordinates $vt_1$ and $vt_2$ allocated to the vertices $v_1$ and v₂, respectively. By such a process, the models in a range from the original model to the most approximated model can be smoothly continuously obtained.

By the above processes, the discrete hierarchical approximated model can be obtained and the model of the middle layer can be also obtained. The approximated model obtained and stored as mentioned above is switched in accordance with the size, position, speed, and attention point of the viewer of the apparent model on the picture plane in the display apparatus 8 and is displayed in step S8. FIGS. 7A and 7B show examples of the approximated model derived by the embodiment.

FIG. 12 schematically shows an example of the processing results according to the embodiment. In this example, the original model is a sphere comprising 182 vertices, 360 planes, and 279 texture coordinates. An image of the earth is adhered as a texture to the sphere. It is approximated for the original model by reducing every 60% in comparison of the number of vertices. FIG. 13 shows a wire frame state of a model when the texture of the same approximated model is not adhered. In FIG. 12, since the image is consistently held, it is difficult to know a degree of approximation, in the approximated state before the texture image is adhered as shown in FIG. 13, the progress of the approximation can be clearly seen.

As specifically shown in FIG. 13, by using the present invention, even if the number of vertices is reduced to 36% or 21.6% of the original model, the hierarchical approximated model can be obtained without losing the general shape which the original model has.

Although the case where the texture image is adhered to the polygon model has been described above, the invention can be also obviously applied to the case where the texture image is not adhered. In this case, step S6 can be omitted in the flowchart shown in FIG. 1 mentioned above.

As described above, according to the invention, when image data (texture) is adhered to geometric data such as polygon data which is used in the CG, the model can be approximated to a desired degree of details while preventing the breakage of the texture shape or an apparent deterioration of the quality.

According to the invention, therefore, there is an effect such that the geometric model which is used in the CG can be approximated in a state in which the texture is adhered. There is also an effect such that not only is the model approximated but also the breakage of the appearance of the texture in the approximation result can be suppressed.

By using the geometric model approximated by the method based on the invention, in the drawing of the CG, there is an effect such that a request for drawing of at a high speed and at a high picture quality can both be satisfied.

Further, according to the invention, an importance degree of each edge constructing the geometric model which is used for the CG can be evaluated by an evaluation value. There is an effect such that the geometric model can be approximated by preferentially removing the edge of a low evaluation value of the edge.

According to the invention, the position of the vertex remaining after the edge was removed can be determined so as to suppress a change in general shape. Thus, there is an effect such that a feeling of disorder upon looking when drawing by using the approximated model can be suppressed.

According to the invention, figure data which is used in the CG can be approximated by a plurality of resolutions. There is an effect such that by using the figure data derived by the invention, both of the goals of drawing at a high speed and drawing with a high quality can be satisfied.

The present invention is not limited to the foregoing embodiments but many modifications and variations are possible within the spirit and scope of the appended claims of the invention.

What is claimed is:

1. A method of approximating an image by decreasing an amount of image data used to create the image, wherein said image data defines a polygonal framework, said framework being composed of line segments drawn between vertices, said method comprising:

evaluating a degree of importance of each line segment of said framework;

removing at least one unnecessary line segment from said framework which is identified based on said evaluation of said degree of importance of each line segment; and determining a position of a vertex after said unnecessary line segment is removed.

2. The method of claim 1, wherein said image data defines a 3-dimensional polygonal framework.

3. The method of claim 1, wherein said evaluating a degree of importance of each line segment is performed by evaluating an amount by which a volume of the polygonal framework defined by the image data is changed by removal of a particular line segment.

4. The method of claim 3, wherein said evaluating a degree of importance of each line segment further comprises assigning a line segment a degree of importance in direct proportion to the amount of volume change caused by removal of that line segment.

5. The method of claim 1, wherein said evaluating a degree of importance of each line segment is performed using a vector (E) which represents a particular line segment, an area (A) of a polygon within said polygonal framework wherein said particular line segment is a side of said polygon, and a vector (N) normal to a plane of said polygon.

6. The method of claim 5, wherein said evaluating a degree of importance of each line segment further comprises calculating an importance of a particular line segment by $(N \cdot E) \times A$, wherein E is said vector representing a particular line segment, A is said area of a polygon sided by said particular line segment, and N is said normal vector.

7. The method of claim 1, wherein said evaluating a degree of importance of each line segment is performed based on an amount by which an area of said polygonal framework defined by said image data is changed by removal of a particular line segment.

8. The method of claim 7, wherein said evaluating a degree of importance of each line segment further comprises assigning a degree of importance to a particular line segment in direct proportion to said amount by which said area of said polygonal framework is changed by removal of that line segment.

9. The method of claim 1, wherein said evaluating a degree of importance of each line segment is performed based on a length of a particular line segment and an area of a polygon within said polygonal framework of which said particular line segment is a side.

10. The method of claim 9, wherein said evaluating a degree of importance of each line segment further comprises calculating a sum of results of an equation $|E| \times A$ for polygons sided by said particular line segment, wherein "$|E|$" is length of that line segment, "A" is an area of a polygon sided by said particular line segment.

11. The method of claim 1, wherein said evaluating a degree of importance of each line segment is performed based on a length of said line segments.

12. The method of claim 11, wherein said evaluating a degree of importance of said line segments further comprises assigning a degree of importance to each line segment in direct proportion to a length of that line segment.

13. The method of claim 1, wherein if two or more line segments are assigned an identical degree of importance, said method further comprises assigning a lowest degree of importance among said two or more line segments to that line segment of said two or more line segments with a shortest length.

14. The method of claim 1, further comprising repeating said steps of evaluating a degree of importance of each line segment; removing an unnecessary line segment; and determining a position of a vertex after said unnecessary line segment is removed.

15. The method of claim 1, wherein said evaluating a degree of importance of each line segment is performed based on an amount by which an amount of said image data is changed by removal of a particular line segment.

16. The method of claim 1, wherein said evaluating a degree of importance of each line segment is performed based on importance values assigned by a user to one or more of said line segments.

17. The method of claim 16, further comprising specifying one or more of said line segments as of high importance, wherein said evaluating a degree of importance of each line segment further comprises preventing said one or more high importance line segments from being designated as said unnecessary line segment.

18. The method of claim 1, wherein said determining a position of a vertex after said unnecessary line segment is removed comprises positioning said vertex at said position such that a total loss of area between a framework including said unnecessary line segment and a framework in which said unnecessary line segment is removed is minimized.

19. The method of claim 1, wherein said determining a position of a vertex after said unnecessary line segment is removed comprises positioning a vertex at a position such that a loss of area to said framework caused by removal of said unnecessary line segment is approximately equal for portions of said framework on opposite sides of said vertex.

20. The method of claim 1, wherein said determining a position of a vertex after said unnecessary line segment is removed comprises positioning said vertex at a position corresponding to an end of said removed unnecessary line segment.

21. The method of claim 1, further comprising, generating an intermediate configuration of said image data by decreasing a length of said unnecessary line segment prior to said step of removing said unnecessary line segment.

22. The method of claim 1, further comprising, generating an intermediate polygonal framework between an original framework including said unnecessary line segment and a new framework with said unnecessary line segment removed.

23. The method of claim 22, wherein said generating an intermediate framework comprises locating a vertex an a position intermediate to a vertex position in said original framework and a vertex position determined in said step of determining a position of a vertex after said unnecessary line segment is removed.

24. The method of claim 23, wherein said locating a vertex at an intermediate position comprises using a linear interpolation on said vertex position in said original framework and said vertex position determined in said step of determining a position of a vertex after said unnecessary line segment is removed.

25. The method of claim 1, further comprising reconfiguring a texture applied to said framework to account for said removing of said unnecessary line segment.

26. The method of claim 1, wherein said evaluation of a degree of importance of each line segment is based in part on an evaluation of the degree of importance of line segments contiguous to a particular line segment being evaluated.

27. The method of claim 1, further comprising reconfiguring said framework after said unnecessary line segment has been removed by placing a new vertex at said position identified in said step of determining a position of a vertex.

28. The method of claim 27, wherein said reconfiguring comprises using said new vertex to replace a previous vertex located at an end of said unnecessary, removed line segment.

29. The method of claim 1, wherein said evaluating a degree of said line segment is performed on the basis of a removal importance value of the line segment obtained from a change amount of said image data caused by the removing of said line segment and on the basis of an assigned importance value of the line segment assigned by a user.

30. The method of claim 29, wherein said evaluating a degree of importance of the line segment decides that the degree of importance of said line segment is small, if said removal importance value and said assigned importance value are both small.

31. The method of claim 29, wherein said assigned importance value is a removing order of said line segments.

32. The method of claim 17, wherein said specifying the at least one line segment as of high importance is performed by a user.

33. The method of claim 17, wherein said specifying the at least one line segment as of high importance specifies a portion where more than two image data are adjacent.

34. The method of claim 18, wherein when the shape of the portion that includes said unnecessary line segment is a concave or convex shape, said vertex is positioned where said total loss of area is minimized.

35. The method of claim 19, wherein when the shape of the portion where said unnecessary line segment is a S-character shape, said vertex is arranged at a position where a loss of area between said original framework and said reconfigured framework is equal on both sides of said vertex.

36. The method of claim 1, wherein said determining a position of said vertex determines the vertex at a position of one of the vertices of the removal line segment.

37. The method of claim 1, further comprising, generating an intermediate configuration of said image data by decreasing a length of said unnecessary line segment.

38. The method of claim 1, further comprising, generating a framework at an intermediate layer between an original framework which is the polygonal framework before said unnecessary line segment is removed and a reconfigured framework which is the polygonal framework after said unnecessary line segment is removed by determining a position of vertices in the intermediate layer on the basis of the relation of the position of said vertices between said original framework and said reconfigured framework.

39. The method of claim 38, said position of said vertices at said intermediate layer is determined by the interpolation of said position of said vertices in said original framework and said reconfigured framework.

40. The method of claim 39, said interpolation is a linear interpolation.

41. The method of claim 1, wherein said removing of said unnecessary line segment removes either one of two vertices constructing the unnecessary line segment; and wherein said determining of a position of said vertex determines the shift amount of the vertex which is constructing the unnecessary line segment and not removed on said removing of said unnecessary line segment.

42. A method of approximating an image by decreasing an amount of image data used to create the image, wherein said image data defines a polygonal framework formed of polygons to which textures or pictures are applied, said polygons of said framework being composed of line segments connected between vertices, said method comprising:

evaluating a degree of importance of each line segment of said framework;

removing an unnecessary line segment identified by said step of evaluating a degree of importance of each line segment;

reconfiguring said framework to account for said removal of said line segment; and reconfiguring said textures or pictures applied to said framework to account for said removal of said line segment.

43. The method of claim 42, wherein said reconfiguring the textures or pictures applied to the framework is preformed altering an association between a vertex of said unnecessary line segment and any of said textures or pictures.

44. The method of claim 42, wherein:

said reconfiguring of said framework comprises replacing two vertices of said framework, between which said unnecessary, removed line segment had been connected, with a single new vertex; and said reconfiguring the textures or pictures applied to the framework comprises determining a new position on said textures or pictures corresponding to a position of said single new vertex in said framework.

45. The method of claim 44, wherein said reconfiguring of said textures or pictures applied to the framework comprises determining said new position by interpolation between two points on the textures or pictures which correspond to the unnecessary line segment.

46. The method of claim 45, wherein said interpolation is a linear interpolation.

47. The method of claim 42, wherein said evaluating a degree of importance of each line segment of said framework further comprises preventing any line segment existing on an outline of any of said textures or pictures from being designated as said unnecessary line segment.

48. The method of claim 42, wherein said evaluating a degree of importance of each line segment of said framework further comprises preventing any line segment, which exists on an outline of any of said textures or pictures from being designated as said unnecessary line segment if a change in an area of said texture or picture resulting from removal of that line segment exceeds a predetermined value.

49. The method of claim 48, wherein said area change amount after the line segment removal is obtained on the basis of a calculation of sum of results of an equation $|(N \cdot E) \times L|$ at line segments corresponding to the boundary lines of the texture or picture existing before and after the line segment to be removed, wherein "E" is representing that line segment, "L" is a length of line segment corresponding to the boundary lines of the texture or picture, "N" is a normal vector of said line segments, "·" is a inner product, and "×" is a product.

50. The method of claim 42, wherein said image data defines a 3-dimensional polygonal framework.

51. The method of claim 42, wherein said evaluating a degree of importance of each line segment is performed by evaluating an amount by which a volume of the polygonal framework defined by the image data is changed by removal of a particular line segment.

52. The method of claim 51, wherein said evaluating a degree of importance of each line segment further comprises assigning a line segment a degree of importance in direct proportion to the amount of volume change caused by removal of that line segment.

53. The method of claim 42, wherein said evaluating a degree of importance of each line segment is performed using a vector (E) which represents a particular line segment, an area (A) of a polygon within said polygonal framework wherein said particular line segment is a side of said polygon, and a vector (N) normal to a plane of said polygon.

54. The method of claim 53, wherein said evaluating a degree of importance of each line segment further comprises calculating an importance of a particular line segment by $(N \cdot E) \times A$, wherein E is said vector representing a particular line segment, A is said area of a polygon sided by said particular line segment, and N is said normal vector.

55. The method of claim 42, wherein said evaluating a degree of importance of each line segment is performed based on an amount by which an area of said polygonal framework defined by said image data is changed by removal of a particular line segment.

56. The method of claim 55, wherein said evaluating a degree of importance of each line segment further comprises assigning a degree of importance to a particular line segment in direct proportion to said amount by which said area of said polygonal framework is changed by removal of that line segment.

57. The method of claim 42, wherein said evaluating a degree of importance of each line segment is performed based on a length of a particular line segment and an area of a polygon within said polygonal framework of which said particular line segment is a side.

58. The method of claim 57, wherein said evaluating a degree of importance of each line segment further comprises calculating a sum of results of an equation $|E| \times A$ for polygons sided by said particular line segment, wherein "$|E|$" is length of that line segment, "A" is an area of a polygon sided by said particular line segment.

59. The method of claim 42, wherein said evaluating a degree of importance of each line segment is performed based on a length of said line segments.

60. The method of claim 59, wherein said evaluating a degree of importance of said line segments further comprises assigning a degree of importance to each line segment in direct proportion to a length of that line segment.

61. The method of claim 42, wherein if two or more line segments are assigned an identical degree of importance, said method further comprises assigning a lowest degree of importance among said two or more line segments to that line segment of said two or more line segments with a shortest length.

62. The method of claim 42, further comprising repeating said steps of evaluating a degree of importance of each line segment; removing an unnecessary line segment; reconfiguring said framework; and reconfiguring said textures or pictures.

63. The method of claim 42, wherein said evaluating a degree of importance of each line segment is performed based on an amount by which an amount of said image data is changed by removal of a particular line segment.

64. The method of claim 42, wherein said evaluating a degree of importance of each line segment is performed based on importance values assigned by a user to one or more of said line segments.

65. The method of claim 64, further comprising specifying one or more of said line segments as of high importance, wherein said evaluating a degree of importance of each line segment further comprises preventing said one or more high importance line segments from being designated as said unnecessary line segment.

66. The method of claim 42, wherein said reconfiguring said framework comprises positioning a vertex at a position such that a total loss of area between a framework including said unnecessary line and a framework in which said unnecessary line segment is removed is minimized.

67. The method of claim 42, wherein said reconfiguring said framework comprises positioning a vertex at a position such that a loss of area to said framework caused by removal of said unnecessary line segment is approximately equal for portions of said framework on opposite sides of said vertex.

68. The method of claim 42, wherein said reconfiguring said framework comprises positioning a new vertex at a position corresponding to an end of said removed unnecessary line segment.

69. The method of claim 42, further comprising, generating an intermediate configuration of said image data by decreasing a length of said unnecessary line segment prior to said step of removing said unnecessary line segment.

70. The method of claim 42, further comprising, generating an intermediate polygonal framework between an original framework including said unnecessary line segment and a new framework with said unnecessary line segment removed.

71. The method of claim 70, wherein said generating an intermediate framework comprises locating a vertex an a position intermediate to a vertex position in said original framework and a vertex position determined in said step of determining a position of a vertex after said unnecessary line segment is removed.

72. The method of claim 71, wherein said locating a vertex at an intermediate position comprises using a linear interpolation on said vertex position in said original framework and said vertex position determined in said step of determining a position of a vertex after said unnecessary line segment is removed.

73. The method of claim 42, wherein said evaluating a degree of importance of each line segment is based in part on an evaluation of a degree of importance of line segments contiguous to a particular line segment being evaluated.

74. The method of claim 42, wherein said reconfiguring said framework comprises using a new vertex to replace a previous vertex located at an end of said unnecessary, removed line segment.

75. The method of claim 42, wherein said reconfiguring said textures or pictures applied to said framework decides a new position of the corresponding point on said textures or pictures where an area change amount of said textures or pictures to be influenced by the approximation lies within a predetermined range.

76. The apparatus of claim 44, wherein said reconfiguring of said textures or pictures applied to the framework comprises determining said new position by interpolation between two points on the textures or pictures which correspond to the unnecessary line segment.

77. An apparatus for use with a display device that approximates an image by decreasing an amount of image data used to create the image, wherein said image data defines a polygonal framework, said framework being composed of line segments drawn between vertices, said device comprising:
 a memory unit for storing said image data; and
 a processor connected to said memory unit, wherein said processor is programmed to:
  (a) assign an importance value to each line segment of said framework;
  (b) remove from said framework that line segment having a lowest importance value; and
  (c) reconfigure said framework to account for said removal of said line segment having said lowest importance value.

78. The apparatus of claim 77, further comprising an input device inputting said image data to said processor for storage in said memory unit.

79. The apparatus of claim 78, wherein said input device comprises a floppy disk drive.

80. The apparatus of claim 78, wherein said input device comprises a magneto-optical disk drive.

81. The apparatus of claim 77, further comprising a user input device for inputting data to said processor.

82. The apparatus of claim 81, wherein said user input device comprises a keyboard.

83. The apparatus of claim 77, wherein said processor is further programmed to reconfigure texture and pictures applied to said framework to account for removal of said line segment.

84. The apparatus of claim 77, said processor, in performing said reconfiguration of said framework, is programmed to replace two vertices of said framework, between which said removed line segment had been connected, with a single new vertex.

85. The apparatus of claim 77, wherein said image data defines a 3-dimensional polygonal framework.

86. The apparatus of claim 77, said processor, in performing said assignment of importance values, is programmed to evaluating an amount by which a volume of the polygonal framework defined by the image data is changed by removal of a particular line segment.

87. The apparatus of claim 86, said processor, in performing said assignment of importance values, is programmed to assign a line segment an importance value in direct proportion to the amount of volume change caused by removal of that line segment.

88. The apparatus of claim 77, said processor, in performing said assignment of importance values, is programmed to use a vector (E) which represents a particular line segment, an area (A) of a polygon within said polygonal framework, wherein said particular line segment is a side of said polygon, and a vector (N) normal to a plane of said polygon.

89. The apparatus of claim 88,
 wherein said processor assigns an importance value to each line segment by calculating an importance of a particular line segment by (N·E)×A,
 wherein E is said vector representing a particular line segment, A is said area of a polygon sided by said particular line segment, and N is said normal vector.

90. The apparatus of claim 77, said processor, in performing said assignment of importance values, is programmed to determine an amount by which an area of said polygonal framework defined by said image data is changed by removal of a particular line segment.

91. The apparatus of claim 90, wherein said processor assigns an importance value to a particular line segment in direct proportion to said amount by which said area of said polygonal framework is changed by removal of that line segment.

92. The apparatus of claim 77, wherein said processor, in performing said assignment of importance values, assigns an importance value to each line segment based on a length of a particular line segment and an area of a polygon within said polygonal framework of which said particular line segment is a side.

93. The apparatus of claim 77, wherein said processor assigns an importance value to each line segment by calculating a sum of results of an equation |E|×A for polygons sided by said particular line segment, wherein "|E|" is length of that line segment, "A" is an area of a polygon sided by said particular line segment.

94. The apparatus of claim 77, wherein said processor, in performing said assignment of importance values, is programmed to assign an importance value to each line segment based on a length of said line segments.

95. The apparatus of claim 77, wherein said processor assigns an importance value to each line segment in direct proportion to a length of that line segment.

96. The apparatus of claim 77, wherein if two or more line segments are assigned an identical degree of importance, said processor assigns a lowest degree of importance among said two or more line segments to that line segment of said two or more line segments with a shortest length.

97. The apparatus of claim 77, wherein said processor is further programmed to repeat said assignment of an importance value to each line segment; said removal of that line segment with the lowest importance value; and said reconfiguration said framework.

98. The apparatus of claim 77, wherein said processor is programmed to assign an importance value to each line segment based on an amount by which an amount of said image data is changed by removal of a particular line segment.

99. The apparatus of claim 77, wherein said processor is programmed to assign an importance value to each line segment based on importance values assigned by a user to one or more of said line segments.

100. The apparatus of claim 77, wherein said processor is programmed to reconfigure said framework by positioning a new vertex at a position such that a total loss of area between a framework including said line segment having said lowest importance value and a framework containing said new vertex and in which said lowest-importance-value line segment is removed is minimized.

101. The apparatus of claim 77, wherein said processor is programmed to reconfigure said framework by positioning a new vertex at a position such that a loss of area to said framework caused by removal of said lowest-importance-value line segment is approximately equal for portions of said framework on opposite sides of said new vertex.

102. The apparatus of claim 77, wherein said processor is programmed to reconfigure said framework by positioning a vertex at a position corresponding to an end of said removed lowest-importance-value line segment.

103. The apparatus of claim 77, wherein said processor is programmed to generate an intermediate configuration of said image data by decreasing a length of said lowest-importance-value line segment.

104. The apparatus of claim 77, wherein said processor is programmed to reconfigure said framework by generating a new vertex to replace a previous vertex located at an end of said removed, lowest-importance-value line segment.

105. A method of approximating an image by decreasing an amount of image data used to create the image, wherein said image data defines a polygonal framework, said framework being composed of line segments drawn between vertices, said method comprising:

assigning an importance value to each line segment of said framework;

removing from said framework that line segment having a lowest importance value; and reconfiguring said framework to account for said removal of said line segment having said lowest importance value.

106. The method of claim 105, wherein said reconfiguring further comprises replacing two vertices of said framework, between which said removed line segment had been connected, with a single new vertex.

107. The method of claim 105, wherein said image data defines a 3-dimensional polygonal framework.

108. The method of claim 105, wherein said assigning an importance value to each line segment is performed by evaluating an amount by which a volume of the polygonal framework defined by the image data is changed by removal of a particular line segment.

109. The method of claim 108, wherein said assigning an importance value to each line segment further comprises assigning a line segment an importance value in direct proportion to the amount of volume change caused by removal of that line segment.

110. The method of claim 105, wherein said assigning an importance value to each line segment is performed using a vector (E) which represents a particular line segment, an area (A) of a polygon within said polygonal framework, wherein said particular line segment is a side of said polygon, and a vector (N) normal to a plane of said polygon.

111. The method of claim 110, wherein said assigning an importance value to each line segment further comprises calculating an importance of a particular line segment by (N·E)×A, wherein E is said vector representing a particular line segment, A is said area of a polygon sided by said particular line segment, and N is said normal vector.

112. The method of claim 105, wherein said assigning an importance value to each line segment is performed based on an amount by which an area of said polygonal framework defined by said image data is changed by removal of a particular line segment.

113. The method of claim 112, wherein said assigning an importance value to each line segment further comprises assigning an importance value to a particular line segment in direct proportion to said amount by which said area of said polygonal framework is changed by removal of that line segment.

114. The method of claim 105, wherein said assigning an importance value to each line segment is performed based on a length of a particular line segment and an area of a polygon within said polygonal framework of which said particular line segment is a side.

115. The method of claim 114, wherein said assigning an importance value to each line segment further comprises calculating a sum of results of an equation |E|×A for polygons sided by said particular line segment, wherein "|E|" is length of that line segment, "A" is an area of a polygon sided by said particular line segment.

116. The method of claim 105, wherein said assigning an importance value to each line segment is performed based on a length of said line segments.

117. The method of claim 116, wherein said assigning an importance value to each of said line segments further comprises assigning an importance value to each line segment in direct proportion to a length of that line segment.

118. The method of claim 105, wherein if two or more line segments are assigned an identical degree of importance, said method further comprises assigning a lowest degree of importance among said two or more line segments to that line segment of said two or more line segments with a shortest length.

119. The method of claim 105, further comprising repeating said steps of assigning an importance value to each line segment; removing that line segment with the lowest importance value; and reconfiguring said framework.

120. The method of claim 105, wherein said assigning an importance value to each line segment is performed based on an amount by which an amount of said image data is changed by removal of a particular line segment.

121. The method of claim 105, wherein said assigning an importance value to each line segment is performed based on importance values assigned by a user to one or more of said line segments.

122. The method of claim 121, further comprising specifying one or more of said line segments as of high importance, wherein assigning an importance value to each line segment further comprises preventing said one or more high importance line segments from being removed.

123. The method of claim 105, wherein said reconfiguring comprises positioning a new vertex at a position such that a total loss of area between a framework including said line segment having said lowest importance value and a framework comprising said new vertex and in which said lowest-importance-value line segment is removed is minimized.

124. The method of claim 105, wherein said reconfiguring comprises positioning a vertex at a position such that a loss of area to said framework caused by removal of said lowest-importance-value line segment is approximately equal for portions of said framework on opposite sides of said vertex.

125. The method of claim 105, wherein said reconfiguring comprises positioning a vertex at a position corresponding to an end of said removed lowest-importance-value line segment.

126. The method of claim 105, further comprising, generating an intermediate configuration of said image data by decreasing a length of said lowest-importance-value line segment prior to said step of removing said lowest-importance-value line segment.

127. The method of claim 105, further comprising, generating an intermediate polygonal framework between an original framework including said lowest-importance-value line segment and a new reconfigured framework with said lowest-importance-value line segment removed.

128. The method of claim 127, wherein said generating an intermediate framework comprises locating a vertex an a position intermediate to a vertex position in said original framework and a new vertex position determined in said step of reconfiguring.

129. The method of claim 128, wherein said locating a vertex at an intermediate position comprises using a linear interpolation on said vertex position in said original framework and said new vertex position determined in said step of reconfiguring.

130. The method of claim 105, further comprising reconfiguring a texture applied to said framework to account for said removing of said lowest-importance-value line segment.

131. The method of claim 105, wherein said assigning an importance value to each line segment is done in accordance with an assigned importance value of line segments contiguous to a particular line segment being evaluated.

132. The method of claim 105, wherein said reconfiguring comprises using a new vertex to replace a previous vertex located at an end of said removed, lowest-importance-value line segment.

133. The method of claim 105, wherein said assigning an importance value to each line segment comprises deciding that the degree of importance of said line segment is small as said change amount of said volume is small.

134. The method of claim 105, wherein said assigning an importance value to each line segment is performed on the basis of a vector which is representing said line segment, an area of a plane of said image data which is composed by at least one of said vertices of said line segment, and a normal vector at said plane.

135. The method of claim 105, wherein said assigning an importance value to each line segment is performed on the basis of a change amount of area of the image specified by said image data when said line segment is removed.

136. The method of claim 135, wherein said assigning an importance value to each line segment comprises deciding that the degree of importance of said line segment is small as said change amount of said area is small.

137. The method of claim 105, wherein said assigning an importance value to each line segment comprises deciding that the degree of importance of said line segment is small as said length of said line segment is short.

138. The method of claim 105, wherein when two or more edges are assigned an identical degree of importance, a shortest line segment of said line segments receiving an identical degree of importance is said unnecessary edge.

139. The method of claim 105, further comprising repeating the step of said evaluating a degree of importance of the line segment, the step of said removing said unnecessary line segment, and the step of said determining said position of said vertex after said unnecessary line segment is removed.

140. The method of claim 105, wherein said evaluating a degree of said line segment is performed on the basis of a removal importance value of the line segment obtained from a change amount of said image data caused by the removing of said line segment and on the basis of an assigned importance value of the line segment assigned by a user.

141. The method of claim 140, wherein said evaluating a degree of importance of the line segment decides that the degree of importance of said line segment is small, if said removal importance value and said assigned importance value are both small.

142. The method of claim 140, wherein said assigned importance value is a removing order of said line segments.

143. The method of claim 105, further comprising specifying at least one said line segment as of high importance, wherein said evaluating a degree of importance of said at least one line segment further comprises preventing said at least one high importance line segment from being designated as said unnecessary line segment.

144. The method of claim 143, wherein said specifying the at least one line segment as of high importance is performed by a user.

145. The method of claim 143, wherein said specifying the at least one line segment as of high importance specifies a portion where more than two image data are adjacent.

146. The method of claim 105, wherein said vertex is decided at a position where a total loss of area between the original framework which is the framework before line segment removing and the reconfigured framework which is the framework after said line segment removing is minimized.

147. The method of claim 146, wherein when the shape of the portion where said removal line segment is a concave or convex shape, said vertex is decided at a position where a total loss of area between said original framework and said reconfigured framework is minimized.

148. The method of claim 105, wherein said vertex is decided at a position where a loss of area between the original framework which is the framework before line segment removing and the reconfigured framework which is the framework after line segment removing is equal on both sides of said vertex.

149. The method of claim 148, wherein when the shape of the portion where said removal line segment is a S-character shape, said vertex is arranged at a position where a loss of area between said original framework and said reconfigured framework is equal on both sides of said vertex.

150. The method of claim 105, wherein said determining a position of said vertex determines the vertex at a position of one of the vertices of the removal line segment.

151. The method of claim 105, further comprising, generating an intermediate configuration of said image data by decreasing a length of said unnecessary line segment.

152. The method of claim 105, further comprising, generating an framework at intermediate layer between said original framework which is the framework before line segment removing and said reconfigured framework which is the framework after line segment removing by determining a position of vertices in the intermediate layer on the basis of the relation of vertices position between said original framework and said reconfigured framework.

153. The method of claim 105, further comprising reconfiguring a texture applied to said framework to account for said removing of said unnecessary line segment.

154. The method of claim 105, wherein said evaluation of degree of importance of the line segment is performed on the basis of an evaluation value of said line segment and evaluation values of peripheral line segments.

155. The method of claim 105, wherein said removing of unnecessary line segment removes either one of two vertices constructing the unnecessary line segment; and
said determining of a position of vertex determines amount of shift the vertex which is constructing the unnecessary line segment and not removed on said removing of unnecessary line segment.

156. An apparatus for approximating an image by decreasing an amount of image data used to create the image, wherein said image data defines a polygonal framework, said framework being composed of line segments drawn between vertices, said apparatus comprising:
a processing apparatus for:
evaluating a degree of importance of each line segment of said framework;
removing at least one unnecessary line segment from said framework which is identified based on said evaluation of said degree of importance of each line segment; and
determining a position of a vertex after said unnecessary line segment is removed.

157. The apparatus of claim 156, wherein said image data defines a 3-dimensional polygonal framework.

158. The apparatus of claim 156, wherein said evaluating a degree of importance of each line segment is performed by evaluating an amount by which a volume of the polygonal framework defined by the image data is changed by removal of a particular line segment.

159. The apparatus of claim 158, wherein said evaluating a degree of importance of each line segment further comprises assigning a line segment a degree of importance in direct proportion to the amount of volume change caused by removal of that line segment.

160. The apparatus of claim 156, wherein said evaluating a degree of importance of each line segment is performed using a vector (E) which represents a particular line segment, an area (A) of a polygon within said polygonal framework wherein said particular line segment is a side of said polygon, and a vector (N) normal to a plane of said polygon.

161. The apparatus of claim 160,
wherein said evaluating a degree of importance of each line segment further comprises calculating an importance of a particular line segment by (N·E)×A,
wherein E is said vector representing a particular line segment, A is said area of a polygon sided by said particular line segment, and N is said normal vector.

162. The apparatus of claim 156, wherein said evaluating a degree of importance of each line segment is performed based on an amount by which an area of said polygonal framework defined by said image data is changed by removal of a particular line segment.

163. The apparatus of claim 162, wherein said evaluating a degree of importance of each line segment further comprises assigning a degree of importance to a particular line segment in direct proportion to said amount by which said area of said polygonal framework is changed by removal of that line segment.

164. The apparatus of claim 156, wherein said evaluating a degree of importance of each line segment is performed based on a length of a particular line segment and an area of a polygon within said polygonal framework of which said particular line segment is a side.

165. The apparatus of claim 164, wherein said evaluating a degree of importance of each line segment further comprises calculating a sum of results of an equation |E|×A for polygons sided by said particular line segment, wherein "|E|" is length of that line segment, "A" is an area of a polygon sided by said particular line segment.

166. The apparatus of claim 156, wherein said evaluating a degree of importance of each line segment is performed based on a length of said line segments.

167. The apparatus of claim 166, wherein said evaluating a degree of importance of said line segments further comprises assigning a degree of importance to each line segment in direct proportion to a length of that line segment.

168. The apparatus of claim 156, wherein if two or more line segments are assigned an identical degree of importance, said processing apparatus assigns a lowest degree of importance among said two or more line segments to that line segment of said two or more line segments with a shortest length.

169. The apparatus of claim 156, wherein said processing apparatus repeats said evaluating a degree of importance of each line segment; said removing an unnecessary line segment; and said determining a position of a vertex after said unnecessary line segment is removed.

170. The apparatus of claim 156, wherein said evaluating a degree of importance of each line segment is performed based on an amount by which an amount of said image data is changed by removal of a particular line segment.

171. The apparatus of claim 156, wherein said evaluating a degree of importance of each line segment is performed based on importance values assigned by a user to one or more of said line segments.

172. The apparatus of claim 171, said processing apparatus specifies one or more of said line segments as of high importance, wherein said evaluating a degree of importance of each line segment further comprises preventing said one or more high importance line segments from being designated as said unnecessary line segment.

173. The apparatus of claim 156, wherein said determining a position of a vertex after said unnecessary line segment is removed comprises positioning said vertex at said position such that a total loss of area between a framework including said unnecessary line segment and a framework in which said unnecessary line segment is removed is minimized.

174. The apparatus of claim 156, wherein said determining a position of a vertex after said unnecessary line segment is removed comprises positioning a vertex at a position such that a loss of area to said framework caused by removal of said unnecessary line segment is approximately equal for portions of said framework on opposite sides of said vertex.

175. The apparatus of claim 156, wherein said determining a position of a vertex after said unnecessary line segment is removed comprises positioning said vertex at a position corresponding to an end of said removed unnecessary line segment.

176. The apparatus of claim 156, said processing apparatus generates an intermediate configuration of said image data by decreasing a length of said unnecessary line segment prior to said step of removing said unnecessary line segment.

177. The apparatus of claim 156, said processing apparatus generates an intermediate polygonal framework between an original framework including said unnecessary line segment and a new framework with said unnecessary line segment removed.

178. The apparatus of claim 177, wherein said generating an intermediate framework comprises locating a vertex an a position intermediate to a vertex position in said original framework and a vertex position determined in said step of determining a position of a vertex after said unnecessary line segment is removed.

179. The apparatus of claim 178, wherein said locating a vertex at an intermediate position comprises using a linear interpolation on said vertex position in said original framework and said vertex position determined in said determining a position of a vertex after said unnecessary line segment is removed.

180. The apparatus of claim 156, said processing apparatus reconfigures a texture applied to said framework to account for said removing of said unnecessary line segment.

181. The apparatus of claim 156, wherein said evaluation of a degree of importance of each line segment is based in part on an evaluation of the degree of importance of line segments contiguous to a particular line segment being evaluated.

182. The apparatus of claim 156, said processing apparatus reconfigures said framework after said unnecessary line segment has been removed by placing a new vertex at said position identified in said step of determining a position of a vertex.

183. The apparatus of claim 182, wherein said reconfiguring comprises using said new vertex to replace a previous vertex located at an end of said unnecessary, removed line segment.

184. An apparatus for approximating an image by decreasing an amount of image data used to create the image, wherein said image data defines a polygonal framework formed of polygons to which textures or pictures are applied, said polygons of said framework being composed of line segments connected between vertices, said apparatus comprising:
a processing apparatus for:
evaluating a degree of importance of each line segment of said framework;
removing an unnecessary line segment identified by said step of evaluating a degree of importance of each line segment;
reconfiguring said framework to account for said removal of said line segment; and
reconfiguring said textures or pictures applied to said framework to account for said removal of said line segment.

185. The apparatus of claim 184, wherein said reconfiguring the textures or pictures applied to the framework is preformed altering an association between a vertex of said unnecessary line segment and any of said textures or pictures.

186. The apparatus of claim 184, wherein:
said reconfiguring of said framework comprises replacing two vertices of said framework, between which said unnecessary, removed line segment had been connected, with a single new vertex; and
said reconfiguring the textures or pictures applied to the framework comprises determining a new position on said textures or pictures corresponding to a position of said single new vertex in said framework.

187. The apparatus of claim 186, wherein said interpolation is a linear interpolation.

188. The apparatus of claim 184, wherein said evaluating a degree of importance of each line segment of said framework further comprises preventing any line segment existing on an outline of any of said textures or pictures from being designated as said unnecessary line segment.

189. The apparatus of claim 184, wherein said evaluating a degree of importance of each line segment of said framework further comprises preventing any line segment, which exists on an outline of any of said textures or pictures from being designated as said unnecessary line segment if a change in an area of said texture or picture resulting from removal of that line segment exceeds a predetermined value.

190. The apparatus of claim 189, wherein said area change amount after the line segment removal is obtained on the basis of a calculation of sum of results of an equation $|(N \cdot E) \times L|$ at line segments corresponding to the boundary lines of the texture or picture existing before and after the line segment to be removed, wherein "E" is representing that line segment, "L" is a length of line segment corresponding to the boundary lines of the texture or picture, "N" is a normal vector of said line segments, "·" is a inner product, and "×" is a product.

191. The apparatus of claim 184, wherein said image data defines a 3-dimensional polygonal framework.

192. The apparatus of claim 184, wherein said evaluating a degree of importance of each line segment is performed by evaluating an amount by which a volume of the polygonal framework defined by the image data is changed by removal of a particular line segment.

193. The apparatus of claim 192, wherein said evaluating a degree of importance of each line segment further comprises assigning a line segment a degree of importance in direct proportion to the amount of volume change caused by removal of that line segment.

194. The apparatus of claim 184, wherein said evaluating a degree of importance of each line segment is performed using a vector (E) which represents a particular line segment, an area (A) of a polygon within said polygonal framework wherein said particular line segment is a side of said polygon, and a vector (N) normal to a plane of said polygon.

195. The apparatus of claim 194,
wherein said evaluating a degree of importance of each line segment further comprises calculating an importance of a particular line segment by $(N \cdot E) \times A$,
wherein E is said vector representing a particular line segment, A is said area of a polygon sided by said particular line segment, and N is said normal vector.

196. The apparatus of claim 184, wherein said evaluating a degree of importance of each line segment is performed based on an amount by which an area of said polygonal framework defined by said image data is changed by removal of a particular line segment.

197. The apparatus of claim 196, wherein said evaluating a degree of importance of each line segment further comprises assigning a degree of importance to a particular line segment in direct proportion to said amount by which said area of said polygonal framework is changed by removal of that line segment.

198. The apparatus of claim 184, wherein said evaluating a degree of importance of each line segment is performed based on a length of a particular line segment and an area of a polygon within said polygonal framework of which said particular line segment is a side.

199. The apparatus of claim 198, wherein said evaluating a degree of importance of each line segment further comprises calculating a sum of results of an equation |E|×A for polygons sided by said particular line segment, wherein "|E|" is length of that line segment, "A" is an area of a polygon sided by said particular line segment.

200. The apparatus of claim 184, wherein said evaluating a degree of importance of each line segment is performed based on a length of said line segments.

201. The apparatus of claim 200, wherein said evaluating a degree of importance of said line segments further comprises assigning a degree of importance to each line segment in direct proportion to a length of that line segment.

202. The apparatus of claim 184, wherein if two or more line segments are assigned an identical degree of importance, said processing apparatus assigns a lowest degree of importance among said two or more line segments to that line segment of said two or more line segments with a shortest length.

203. The apparatus of claim 184, said processing apparatus repeats said steps of evaluating a degree of importance of each line segment; removing an unnecessary line segment; reconfiguring said framework; and reconfiguring said textures or pictures.

204. The apparatus of claim 184, wherein said evaluating a degree of importance of each line segment is performed based on an amount by which an amount of said image data is changed by removal of a particular line segment.

205. The apparatus of claim 184, wherein said evaluating a degree of importance of each line segment is performed based on importance values assigned by a user to one or more of said line segments.

206. The apparatus of claim 205, said processing apparatus specifies one or more of said line segments as of high importance, wherein said evaluating a degree of importance of each line segment further comprises preventing said one or more high importance line segments from being designated as said unnecessary line segment.

207. The apparatus of claim 184, wherein said reconfiguring said framework comprises positioning a vertex at a position such that a total loss of area between a framework including said unnecessary line and a framework in which said unnecessary line segment is removed is minimized.

208. The apparatus of claim 184, wherein said reconfiguring said framework comprises positioning a vertex at a position such that a loss of area to said framework caused by removal of said unnecessary line segment is approximately equal for portions of said framework on opposite sides of said vertex.

209. The apparatus of claim 184, wherein said reconfiguring said framework comprises positioning a new vertex at a position corresponding to an end of said removed unnecessary line segment.

210. The apparatus of claim 184, said processing apparatus generates an intermediate configuration of said image data by decreasing a length of said unnecessary line segment prior to said step of removing said unnecessary line segment.

211. The apparatus of claim 184, said processing apparatus generates an intermediate polygonal framework between an original framework including said unnecessary line segment and a new framework with said unnecessary line segment removed.

212. The apparatus of claim 211, wherein said generating an intermediate framework comprises locating a vertex an a position intermediate to a vertex position in said original framework and a vertex position determined in said step of determining a position of a vertex after said unnecessary line segment is removed.

213. The apparatus of claim 212, wherein said locating a vertex at an intermediate position comprises using a linear interpolation on said vertex position in said original framework and said vertex position determined in said determining a position of a vertex after said unnecessary line segment is removed.

214. The apparatus of claim 184, wherein said evaluating a degree of importance of each line segment is based in part on an evaluation of a degree of importance of line segments contiguous to a particular line segment being evaluated.

215. The apparatus of claim 184, wherein said reconfiguring said framework comprises using a new vertex to replace a previous vertex located at an end of said unnecessary, removed line segment.

216. A medium for storing image data for approximating an image by decreasing an amount of said image data used to create the image, wherein said image data defines a polygonal framework, said framework being composed of line segments drawn between vertices, said medium comprising:

a memory unit for storing said image data, wherein said image data stored onto said memory unit are generated by:
evaluating a degree of importance of each line segment of said framework;
removing at least one unnecessary line segment from said framework which is identified based on said evaluation of said degree of importance of each line segment; and
determining a position of a vertex after said unnecessary line segment is removed.

217. The medium of claim 216, wherein said image data defines a 3-dimensional polygonal framework.

218. The medium of claim 216, wherein said evaluating a degree of importance of each line segment is performed by evaluating an amount by which a volume of the polygonal framework defined by the image data is changed by removal of a particular line segment.

219. The medium of claim 218, wherein said evaluating a degree of importance of each line segment further comprises assigning a line segment a degree of importance in direct proportion to the amount of volume change caused by removal of that line segment.

220. The medium of claim 216, wherein said evaluating a degree of importance of each line segment is performed using a vector (E) which represents a particular line segment, an area (A) of a polygon within said polygonal framework wherein said particular line segment is a side of said polygon, and a vector (N) normal to a plane of said polygon.

221. The medium of claim 220,
wherein said evaluating a degree of importance of each line segment further comprises calculating an importance of a particular line segment by (N·E)×A,
wherein E is said vector representing a particular line segment, A is said area of a polygon sided by said particular line segment, and N is said normal vector.

222. The medium of claim 216, wherein said evaluating a degree of importance of each line segment is performed based on an amount by which an area of said polygonal framework defined by said image data is changed by removal of a particular line segment.

223. The medium of claim 222, wherein said evaluating a degree of importance of each line segment further comprises assigning a degree of importance to a particular line segment in direct proportion to said amount by which said area of said polygonal framework is changed by removal of that line segment.

224. The medium of claim 216, wherein said evaluating a degree of importance of each line segment is performed based on a length of a particular line segment and an area of a polygon within said polygonal framework of which said particular line segment is a side.

225. The medium of claim 224, wherein said evaluating a degree of importance of each line segment further comprises calculating a sum of results of an equation |E|×A for polygons sided by said particular line segment, wherein "|E|" is length of that line segment, "A" is an area of a polygon sided by said particular line segment.

226. The medium of claim 216, wherein said evaluating a degree of importance of each line segment is performed based on a length of said line segments.

227. The medium of claim 226, wherein said evaluating a degree of importance of said line segments further comprises assigning a degree of importance to each line segment in direct proportion to a length of that line segment.

228. The medium of claim 216, wherein if two or more line segments are assigned an identical degree of importance, a lowest degree of importance among said two or more line segments is assigned to that line segment of said two or more line segments with a shortest length.

229. The medium of claim 216, further comprising repeating said evaluating a degree of importance of each line segment; said removing an unnecessary line segment; and said determining a position of a vertex after said unnecessary line segment is removed.

230. The medium of claim 216, wherein said evaluating a degree of importance of each line segment is performed based on an amount by which an amount of said image data is changed by removal of a particular line segment.

231. The medium of claim 216, wherein said evaluating a degree of importance of each line segment is performed based on importance values assigned by a user to one or more of said line segments.

232. The medium of claim 231, further comprising specifying one or more of said line segments as of high importance, wherein said evaluating a degree of importance of each line segment further comprises preventing said one or more high importance line segments from being designated as said unnecessary line segment.

233. The medium of claim 216, wherein said determining a position of a vertex after said unnecessary line segment is removed comprises positioning said vertex at said position such that a total loss of area between a framework including said unnecessary line segment and a framework in which said unnecessary line segment is removed is minimized.

234. The medium of claim 216, wherein said determining a position of a vertex after said unnecessary line segment is removed comprises positioning a vertex at a position such that a loss of area to said framework caused by removal of said unnecessary line segment is approximately equal for portions of said framework on opposite sides of said vertex.

235. The medium of claim 216, wherein said determining a position of a vertex after said unnecessary line segment is removed comprises positioning said vertex at a position corresponding to an end of said removed unnecessary line segment.

236. The medium of claim 216, wherein an intermediate configuration of said image data is generated by decreasing a length of said unnecessary line segment prior to said removing said unnecessary line segment.

237. The medium of claim 216, wherein an intermediate polygonal framework is generated between an original framework including said unnecessary line segment and a new framework with said unnecessary line segment removed.

238. The medium of claim 237, wherein said generating an intermediate framework comprises locating a vertex an a position intermediate to a vertex position in said original framework and a vertex position determined in said determining a position of a vertex after said unnecessary line segment is removed.

239. The medium of claim 238, wherein said locating a vertex at an intermediate position comprises using a linear interpolation on said vertex position in said original framework and said vertex position determined in said determining a position of a vertex after said unnecessary line segment is removed.

240. The medium of claim 216, further comprising reconfiguring a texture applied to said framework to account for said removing of said unnecessary line segment.

241. The medium of claim 216, wherein said evaluation of a degree of importance of each line segment is based in part on an evaluation of the degree of importance of line segments contiguous to a particular line segment being evaluated.

242. The medium of claim 216, further comprising reconfiguring said framework after said unnecessary line segment has been removed by placing a new vertex at said position identified in said determining a position of a vertex.

243. The medium of claim 242, wherein said reconfiguring comprises using said new vertex to replace a previous vertex located at an end of said unnecessary, removed line segment.

244. A medium for storing image data for approximating an image by decreasing an amount of image data used to create the image, wherein said image data defines a polygonal framework, said framework being composed of line segments drawn between vertices, said medium comprising:
a memory unit for storing said image data, wherein said image data stored onto said memory unit are generated by:
assigning an importance value to each line segment of said framework;
removing from said framework that line segment having a lowest importance value; and
reconfiguring said framework to account for said removal of said line segment having said lowest importance value.

245. The medium of claim 244, wherein said reconfiguring further comprises replacing two vertices of said framework, between which said removed line segment had been connected, with a single new vertex.

246. The medium of claim 244, wherein said image data defines a 3-dimensional polygonal framework.

247. The medium of claim 244, wherein said assigning an importance value to each line segment is performed by evaluating an amount by which a volume of the polygonal framework defined by the image data is changed by removal of a particular line segment.

248. The medium of claim 247, wherein said assigning an importance value to each line segment further comprises assigning a line segment an importance value in direct proportion to the amount of volume change caused by removal of that line segment.

249. The medium of claim 244, wherein said assigning an importance value to each line segment is performed using a vector (E) which represents a particular line segment, an area (A) of a polygon within said polygonal framework, wherein said particular line segment is a side of said polygon, and a vector (N) normal to a plane of said polygon.

250. The medium of claim 249,
wherein said assigning an importance value to each line segment further comprises calculating an importance of a particular line segment by (N·E)×A,
wherein E is said vector representing a particular line segment, A is said area of a polygon sided by said particular line segment, and N is said normal vector.

251. The medium of claim 244, wherein said assigning an importance value to each line segment is performed based on an amount by which an area of said polygonal framework defined by said image data is changed by removal of a particular line segment.

252. The medium of claim 251, wherein said assigning an importance value to each line segment further comprises assigning an importance value to a particular line segment in direct proportion to said amount by which said area of said polygonal framework is changed by removal of that line segment.

253. The medium of claim 244, wherein said assigning an importance value to each line segment is performed based on a length of a particular line segment and an area of a polygon within said polygonal framework of which said particular line segment is a side.

254. The medium of claim 252, wherein said assigning an importance value to each line segment further comprises calculating a sum of results of an equation |E|×A for polygons sided by said particular line segment, wherein "|E|" is length of that line segment, "A" is an area of a polygon sided by said particular line segment.

255. The medium of claim 244, wherein said assigning an importance value to each line segment is performed based on a length of said line segments.

256. The medium of claim 255, wherein said assigning an importance value to each of said line segments further comprises assigning an importance value to each line segment in direct proportion to a length of that line segment.

257. The medium of claim 244, wherein if two or more line segments are assigned an identical degree of importance, a lowest degree of importance is assigned among said two or more line segments to that line segment of said two or more line segments with a shortest length.

258. The medium of claim 244, further comprising repeating said steps of assigning an importance value to each line segment; removing that line segment with the lowest importance value; and reconfiguring said framework.

259. The medium of claim 244, wherein said assigning an importance value to each line segment is performed based on an amount by which an amount of said image data is changed by removal of a particular line segment.

260. The medium of claim 244, wherein said assigning an importance value to each line segment is performed based on importance values assigned by a user to one or more of said line segments.

261. The medium of claim 260, further comprising specifying one or more of said line segments as of high importance, wherein assigning an importance value to each line segment further comprises preventing said one or more high importance line segments from being removed.

262. The medium of claim 244, wherein said reconfiguring comprises positioning a new vertex at a position such that a total loss of area between a framework including said line segment having said lowest importance value and a framework comprising said new vertex and in which said lowest-importance-value line segment is removed is minimized.

263. The medium of claim 244, wherein said reconfiguring comprises positioning a vertex at a position such that a loss of area to said framework caused by removal of said lowest-importance-value line segment is approximately equal for portions of said framework on opposite sides of said vertex.

264. The medium of claim 244, wherein said reconfiguring comprises positioning a vertex at a position corresponding to an end of said removed lowest-importance-value line segment.

265. The medium of claim 244, wherein an intermediate configuration of said image data is generated by decreasing a length of said lowest-importance-value line segment prior to said removing said lowest-importance-value line segment.

266. The medium of claim 244, wherein an intermediate polygonal framework is generated between an original framework including said lowest-importance-value line segment and a new reconfigured framework with said lowest-importance-value line segment removed.

267. The medium of claim 266, wherein said generating an intermediate framework comprises locating a vertex an a position intermediate to a vertex position in said original framework and a new vertex position determined in said reconfiguring.

268. The medium of claim 267, wherein said locating a vertex at an intermediate position comprises using a linear interpolation on said vertex position in said original framework and said new vertex position determined in said reconfiguring.

269. The medium of claim 244, wherein a texture applied to said framework is reconfigured to account for said removing of said lowest-importance-value line segment.

270. The medium of claim 244, wherein said assigning an importance value to each line segment is done in accordance with an assigned importance value of line segments contiguous to a particular line segment being evaluated.

271. The medium of claim 244, wherein said reconfiguring comprises using a new vertex to replace a previous vertex located at an end of said removed, lowest-importance-value line segment.

272. A medium for storing image data for approximating an image by decreasing an amount of image data used to create the image, wherein said image data defines a polygonal framework formed of polygons to which textures or pictures are applied, said polygons of said framework being composed of line segments connected between vertices, said medium comprising:
a memory unit for storing said image data, wherein said image data stored onto said memory unit are generated by:
evaluating a degree of importance of each line segment of said framework;

removing an unnecessary line segment identified by said evaluating a degree of importance of each line segment;
reconfiguring said framework to account for said removal of said line segment; and
reconfiguring said textures or pictures applied to said framework to account for said removal of said line segment.

273. The medium of claim 272, wherein said reconfiguring the textures or pictures applied to the framework is preformed altering an association between a vertex of said unnecessary line segment and any of said textures or pictures.

274. The medium of claim 272, wherein:
said reconfiguring of said framework comprises replacing two vertices of said framework, between which said unnecessary, removed line segment had been connected, with a single new vertex; and
said reconfiguring the textures or pictures applied to the framework comprises determining a new position on said textures or pictures corresponding to a position of said single new vertex in said framework.

275. The medium of claim 274, wherein said reconfiguring of said textures or pictures applied to the framework comprises determining said new position by interpolation between two points on the textures or pictures which correspond to the unnecessary line segment.

276. The medium of claim 275, wherein said interpolation is a linear interpolation.

277. The medium of claim 272, wherein said evaluating a degree of importance of each line segment of said framework further comprises preventing any line segment existing on an outline of any of said textures or pictures from being designated as said unnecessary line segment.

278. The medium of claim 272, wherein said evaluating a degree of importance of each line segment of said framework further comprises preventing any line segment, which exists on an outline of any of said textures or pictures from being designated as said unnecessary line segment if a change in an area of said texture or picture resulting from removal of that line segment exceeds a predetermined value.

279. The medium of claim 278, wherein said area change amount after the line segment removal is obtained on the basis of a calculation of sum of results of an equation $|(N \cdot E) \times L|$ at line segments corresponding to the boundary lines[]of the texture or picture existing before and after the line segment to be removed, wherein "E" is representing that line segment, "L" is a length of line segment corresponding to the boundary lines of the texture or picture, "N" is a normal vector of said line segments, "·" is a inner product, and "×" is a product.

280. The medium of claim 272, wherein said image data defines a 3-dimensional polygonal framework.

281. The medium of claim 272, wherein said evaluating a degree of importance of each line segment is performed by evaluating an amount by which a volume of the polygonal framework defined by the image data is changed by removal of a particular line segment.

282. The medium of claim 281, wherein said evaluating a degree of importance of each line segment further comprises assigning a line segment a degree of importance in direct proportion to the amount of volume change caused by removal of that line segment.

283. The medium of claim 272, wherein said evaluating a degree of importance of each line segment is performed using a vector (E) which represents a particular line segment, an area (A) of a polygon within said polygonal framework wherein said particular line segment is a side of said polygon, and a vector (N) normal to a plane of said polygon.

284. The medium of claim 283,
wherein said evaluating a degree of importance of each line segment further comprises calculating an importance of a particular line segment by $(N \cdot E) \times A$,
wherein E is said vector representing a particular line segment, A is said area of a polygon sided by said particular line segment, and N is said normal vector.

285. The medium of claim 272, wherein said evaluating a degree of importance of each line segment is performed based on an amount by which an area of said polygonal framework defined by said image data is changed by removal of a particular line segment.

286. The medium of claim 285, wherein said evaluating a degree of importance of each line segment further comprises assigning a degree of importance to a particular line segment in direct proportion to said amount by which said area of said polygonal framework is changed by removal of that line segment.

287. The medium of claim 272, wherein said evaluating a degree of importance of each line segment is performed based on a length of a particular line segment and an area of a polygon within said polygonal framework of which said particular line segment is a side.

288. The medium of claim 287, wherein said evaluating a degree of importance of each line segment further comprises calculating a sum of results of an equation $|E| \times A$ for polygons sided by said particular line segment, wherein "|E|" is length of that line segment, "A" is an area of a polygon sided by said particular line segment.

289. The medium of claim 272, wherein said evaluating a degree of importance of each line segment is performed based on a length of said line segments.

290. The medium of claim 289, wherein said evaluating a degree of importance of said line segments further comprises assigning a degree of importance to each line segment in direct proportion to a length of that line segment.

291. The medium of claim 272, wherein if two or more line segments are assigned an identical degree of importance, a lowest degree of importance is assigned among said two or more line segments to that line segment of said two or more line segments with a shortest length.

292. The medium of claim 272, further comprising repeating said steps of evaluating a degree of importance of each line segment; removing an unnecessary line segment; reconfiguring said framework; and reconfiguring said textures or pictures.

293. The medium of claim 272, wherein said evaluating a degree of importance of each line segment is performed based on an amount by which an amount of said image data is changed by removal of a particular line segment.

294. The medium of claim 272, wherein said evaluating a degree of importance of each line segment is performed based on importance values assigned by a user to one or more of said line segments.

295. The medium of claim 294, one or more of said line segments is specified as of high importance, wherein said evaluating a degree of importance of each line segment further comprises preventing said one or more high importance line segments from being designated as said unnecessary line segment.

296. The medium of claim 272, wherein said reconfiguring said framework comprises positioning a vertex at a position such that a total loss of area between a framework including said unnecessary line and a framework in which said unnecessary line segment is removed is minimized.

297. The medium of claim 272, wherein said reconfiguring said framework comprises positioning a vertex at a position such that a loss of area to said framework caused by removal of said unnecessary line segment is approximately equal for portions of said framework on opposite sides of said vertex.

298. The medium of claim 272, wherein said reconfiguring said framework comprises positioning a new vertex at a position corresponding to an end of said removed unnecessary line segment.

299. The medium of claim 272, wherein an intermediate configuration of said image data is generated by decreasing a length of said unnecessary line segment prior to said removing said unnecessary line segment.

300. The medium of claim 272, wherein an intermediate polygonal framework between an original framework is generated to include said unnecessary line segment and a new framework with said unnecessary line segment removed.

301. The medium of claim 300, wherein said generating an intermediate framework comprises locating a vertex an a position intermediate to a vertex position in said original framework and a vertex position determined in said determining a position of a vertex after said unnecessary line segment is removed.

302. The medium of claim 301, wherein said locating a vertex at an intermediate position comprises using a linear At interpolation on said vertex position in said original framework and said vertex position determined in said determining a position of a vertex after said unnecessary line segment is removed.

303. The medium of claim 272, werein said evaluating a degree of importance of each line segment is based in part on an evaluation of a degree of importance of line segments contiguous to a particular line segment being evaluated.

304. The medium of claim 272, wherein said reconfiguring said framework comprises using a new vertex to replace a previous vertex located at an end of said unnecessary, removed line segment.

\* \* \* \* \*

UNITED STATES PATENT AND TRADEMARK OFFICE
CERTIFICATE OF CORRECTION

PATENT NO. : 6,396,952 B1
DATED : May 28, 2002
INVENTOR(S) : Junji Horikawa et al.

It is certified that error appears in the above-identified patent and that said Letters Patent is hereby corrected as shown below:

Column 25,
Line 34, replace "either one of two" with -- either one or two --.

Column 35,
Line 46, replace "lines[]of the texture" with -- lines of the texture --

Column 38,
Line 7, replace "At interpolation on" with -- interpolation on --

Signed and Sealed this

Fourteenth Day of October, 2003

JAMES E. ROGAN
*Director of the United States Patent and Trademark Office*